US010040172B2

(12) United States Patent
Weissenborn

(10) Patent No.: US 10,040,172 B2
(45) Date of Patent: *Aug. 7, 2018

(54) SKI OR SNOWBOARD HOLDING DEVICE

(71) Applicant: Richard Weissenborn, Calgary (CA)

(72) Inventor: Richard Weissenborn, Calgary (CA)

( * ) Notice: Subject to any disclaimer, the term of this patent is extended or adjusted under 35 U.S.C. 154(b) by 775 days.

This patent is subject to a terminal disclaimer.

(21) Appl. No.: 14/491,195

(22) Filed: Sep. 19, 2014

(65) Prior Publication Data

US 2015/0014910 A1    Jan. 15, 2015

Related U.S. Application Data

(62) Division of application No. 13/690,309, filed on Nov. 30, 2012, now Pat. No. 8,905,391, which is a division
(Continued)

(51) Int. Cl.
| | |
|---|---|
| *B23Q 3/02* | (2006.01) |
| *B25B 1/20* | (2006.01) |
| *A63C 11/26* | (2006.01) |
| *B25B 1/10* | (2006.01) |
| *B25B 1/24* | (2006.01) |
| *B25B 5/14* | (2006.01) |
| *B25B 27/00* | (2006.01) |
| *B25H 1/00* | (2006.01) |
| *F41A 23/16* | (2006.01) |
| *F41A 23/18* | (2006.01) |
| *B23Q 3/06* | (2006.01) |

(52) U.S. Cl.
CPC ............... *B25B 1/20* (2013.01); *A63C 11/26* (2013.01); *B23Q 3/064* (2013.01); *B23Q 3/066* (2013.01); *B25B 1/10* (2013.01); *B25B 1/106* (2013.01); *B25B 1/2484* (2013.01); *B25B 5/14* (2013.01); *B25B 27/0071* (2013.01); *B25H 1/0014* (2013.01); *F41A 23/16* (2013.01); *F41A 23/18* (2013.01)

(58) Field of Classification Search
CPC .... B25B 1/20; B25B 1/10; B25B 5/14; B25B 27/0071; B25B 1/2484; B25B 1/106; B23Q 3/064; B23Q 3/066; F41A 23/18; F41A 23/16; B25H 1/0014; A63C 11/26
See application file for complete search history.

(56) References Cited

U.S. PATENT DOCUMENTS

| | | |
|---|---|---|
| 994,630 A | 6/1911 | Bergstrom |
| 1,352,647 A | 9/1920 | Benton |
| (Continued) | | |

*Primary Examiner* — David Bryant
*Assistant Examiner* — Nirvana Deonauth
(74) *Attorney, Agent, or Firm* — Robert Nakano

(57) ABSTRACT

The disclosure relates to a holder system for supporting sports equipment. The holder comprises a vise assembly comprising: a vise base; two moveable vise jaws provided with respective vise screw bores and guide bores, the two moveable vise jaws engageable with a first section on the sports equipment; a vise screw extending substantially horizontally through the vise base and oppositely disposing the movable vise jaws through the vise screw bores, and having two sections of threads allowing for movement of the movable vise jaws, the two sections being separated by a thread-free section; and one or more guide bars fixed in a substantially horizontal orientation in the vise base and extending through the respective guide bores.

20 Claims, 34 Drawing Sheets

Related U.S. Application Data of application No. 12/347,456, filed on Dec. 31, 2008, now Pat. No. 8,342,495.

(56) References Cited

U.S. PATENT DOCUMENTS

| | | | |
|---|---|---|---|
| 1,369,747 A | | 2/1921 | Jordan |
| 1,410,184 A | | 3/1922 | Hunter |
| 2,455,517 A | | 12/1948 | Nielson |
| 2,606,583 A | | 8/1952 | O'Connor |
| 2,636,527 A | | 4/1953 | Schiemann |
| 2,669,958 A | | 2/1954 | Sweeney |
| 2,778,939 A | | 1/1957 | Haddad |
| 2,907,630 A | | 10/1959 | Lawroski |
| 2,944,811 A | | 7/1960 | Wolf |
| 3,574,900 A | | 4/1971 | Emery |
| 3,613,983 A | * | 10/1971 | Gage .................... B23K 20/121 156/73.5 |
| 3,826,482 A | | 7/1974 | Tourangeau |
| 3,861,664 A | | 1/1975 | Durkee |
| 3,866,610 A | * | 2/1975 | Kletschka .......... A61B 17/2812 606/208 |
| 3,981,491 A | | 9/1976 | Snyder |
| 4,141,542 A | | 2/1979 | Wolff |
| 4,341,375 A | * | 7/1982 | Romanin ............... B25B 1/103 269/153 |
| 4,500,077 A | | 2/1985 | Coxon |
| 4,531,559 A | * | 7/1985 | Glasgo .................... B27F 1/12 144/144.1 |
| 4,583,724 A | * | 4/1986 | Huang ...................... B25B 1/20 269/182 |
| 4,607,829 A | | 8/1986 | Suska |
| 4,824,086 A | | 4/1989 | Rickling et al. |
| 4,825,513 A | | 5/1989 | Verespej |
| 4,828,210 A | | 5/1989 | Anderson et al. |
| 4,919,406 A | | 4/1990 | Bunnell |
| 4,969,636 A | | 11/1990 | Gautam |
| 5,081,782 A | | 1/1992 | Wright |
| 5,405,124 A | | 4/1995 | Mayer et al. |
| 5,497,967 A | | 3/1996 | Gantois |
| 5,605,321 A | | 2/1997 | Jarvis |
| 5,765,822 A | | 6/1998 | Mead |
| 5,893,550 A | | 4/1999 | Lassley |
| 5,996,814 A | | 12/1999 | Workman et al. |
| 6,305,679 B1 | | 10/2001 | Brill |
| 6,663,094 B2 | | 12/2003 | Weissenborn |
| 6,880,817 B2 | | 4/2005 | Clarke |
| 7,356,960 B1 | | 4/2008 | Knitt |
| 7,478,794 B1 | | 1/2009 | Gohlke et al. |
| 8,905,391 B2 | * | 12/2014 | Weissenborn ......... A63C 11/26 269/101 |
| 2004/0232608 A1 | | 11/2004 | Wong |
| 2015/0137441 A1 | * | 5/2015 | Liang .................... B25B 1/125 269/181 |

* cited by examiner

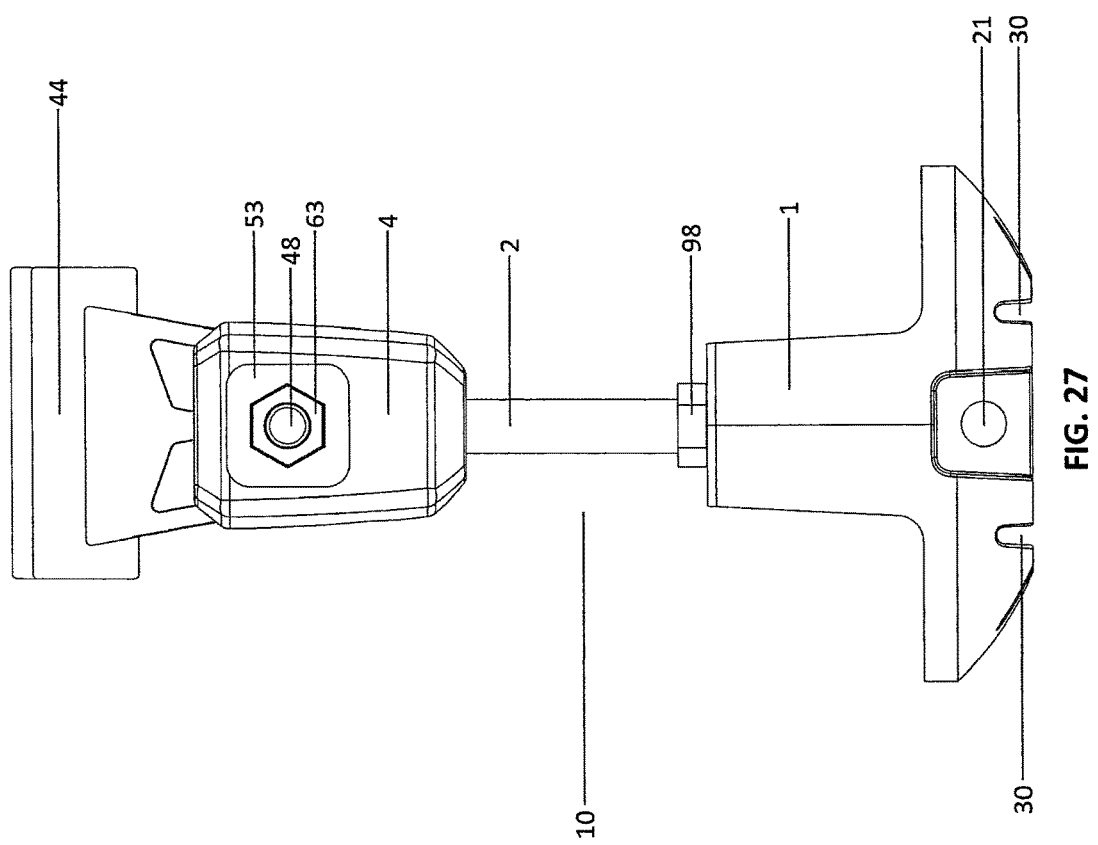

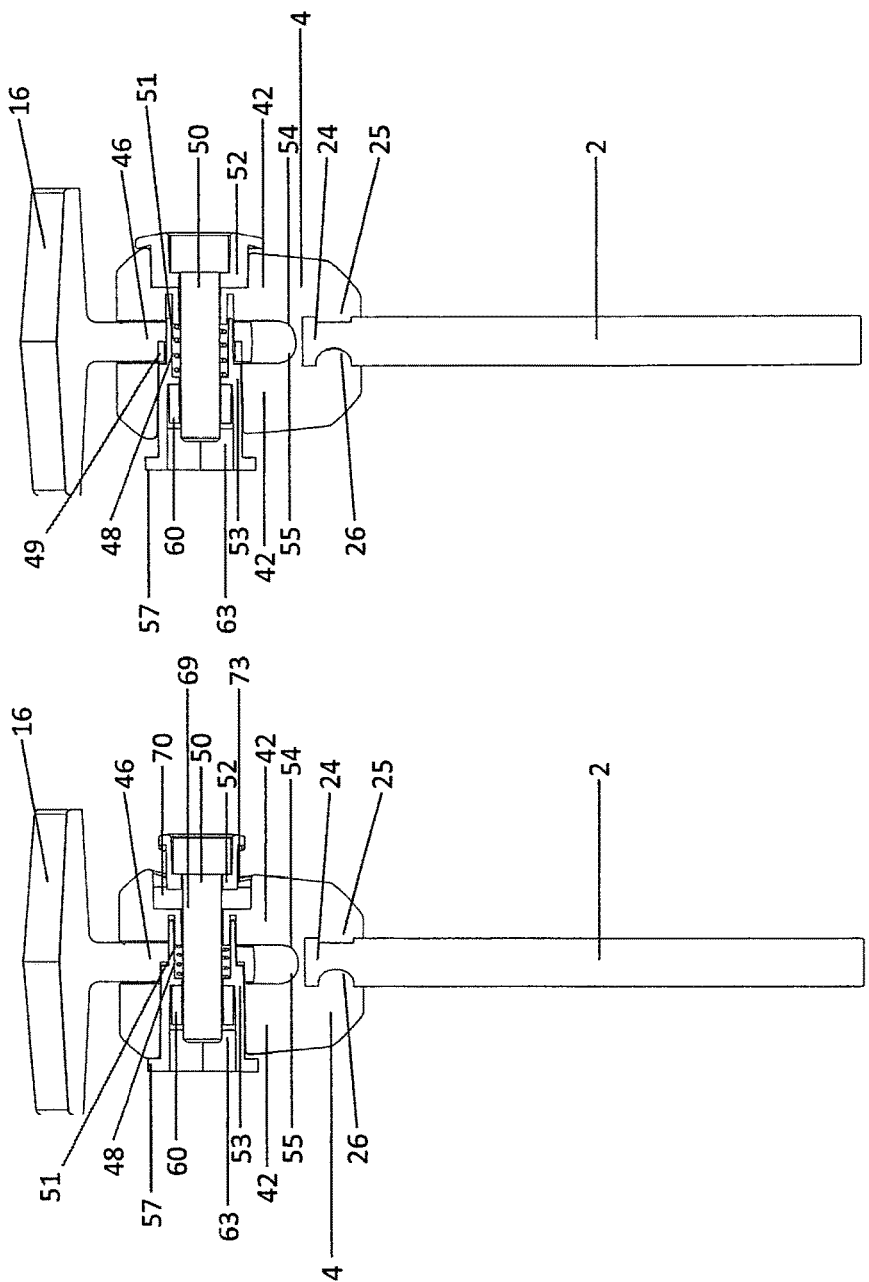

SKI OR SNOWBOARD HOLDING DEVICE

RELATED APPLICATION

This application is a divisional application of U.S. patent application Ser. No. 13/690,309 filed on Nov. 20, 2012 (now U.S. Pat. No. 8,905,391), which itself is a divisional application of U.S. patent application Ser. No. 12/347,456 filed on Dec. 31, 2008 (now U.S. Pat. No. 8,342,495).

FIELD OF THE DISCLOSURE

This disclosure relates to the field of portable apparatus for holding sports equipment including skis or snowboards in such a manner as to facilitate a variety of tasks including cleaning, maintenance, adjustment and repair.

BACKGROUND OF THE DISCLOSURE

Various forms of devices for holding skis on or above a stationary support such as a work bench to allow for preparation of the ski base and edges are known. Snowboards have become increasingly popular in recent years and, as is the case with skis, snowboards are tuned on a regular basis by many users. Tuning procedures for both skis and snowboards include cleaning, waxing, repair of the base materials, maintenance of the edges, binding mounting and binding adjustment. As with skis and snowboards, bicycles require frequent maintenance and are tuned by many users on an ongoing basis. Bicycle maintenance procedures include cleaning, adjustment, repair and/or replacement of various bicycle component parts. A wide variety of firearms also require periodic maintenance. Examples of firearm maintenance procedures include inspection, cleaning, repair and sighting.

Systems exist that hold both skis and snowboards. Most of the systems are essentially rests, that is to say a ski or snowboard is placed on a pair of spaced-apart supports as shown in U.S. Pat. No. 5,893,550 to Lassley and U.S. Pat. No. 6,305,679 to Brill. Lassley describes the use of suction cups to engage the surface of a ski or snowboard. Suction cups as described by Lassley tend to flex when pressure is applied to the base during wax scraping and brushing procedures causing undesirable movement of the ski or snowboard during the tuning process. The suction cups also tend to lose suction or have difficulty keeping a vacuum when there are scratches, irregularities, dust or dirt on the surface of the ski or snowboard, or when the surface of the ski or snowboard is not flat. Brill describes anti-slip pads that rely on friction to hold a ski or snowboard in place when positioned base-up, however relying on adhesion of the anti-slip pads alone is not enough to prevent unwanted movement during the aforementioned wax scraping and brushing procedures.

As snowboards are typically three times wider than skis it is difficult to provide a support wide enough to support the entire width of a snowboard that does not hinder or interfere with base tuning procedures when a relatively narrow ski is placed on the same support. For example, the horizontal cross members of Brill's supporting stand obstruct and prevent base rilling, structuring and/or imprinting tools with flanges of a thickness greater than the thickness of a ski from being drawn down the ski base as required when the ski is resting base up on Brill's stand.

Many skis have a brake including prongs which pivot to a lowered position to dig into the snow and prevent the ski from sliding uncontrolled downhill in the event a ski boot is released from a ski binding. It is preferable when tuning skis having a brake to retract the brake so as not to interfere with tuning procedures. Various devices for holding skis that retract the brake are known. For example, U.S. Pat. No. 6,663,094 to Weissenborn describes a ski holding apparatus with an intermediate device that secures a ski to a work station while retracting and holding the brake.

It may be preferable with certain types of skis to have the ability to fasten the ski to a holder using the ski binding. One such device is disclosed in U.S. Pat. No. 4,919,406 to Bunnell. Bunnell incorporates u-shaped supports allowing the attachment of certain types of cross country, touring and backcountry touring bindings. As is the case with U.S. Pat. No. 6,663,094 to Weissenborn, Bunnell's ski support is limited in its ability as it cannot be used to tune a ski without a binding or hold a ski to facilitate binding mounting. Further disadvantages exist as Bunnell's support is rather large, cumbersome and not very versatile.

It is generally preferable to hold sports equipment including skis, snowboards, bicycles and firearms firmly when performing tuning and maintenance procedures. One mechanical system for holding a snowboard is disclosed in U.S. Pat. No. 6,880,817 to Clarke. Clarke employs a sizeable board rest adapted to engage the snowboard threaded inserts and contact the top surface across the width of a snowboard. One disadvantage of Clarke's apparatus is due to the size of the board rest. The snowboard bindings must first be removed in order to mount the support apparatus to the snowboard. Removing the snowboard bindings is time consuming and unnecessary for most tuning procedures. Further, the support apparatus described by Clarke only supports the snowboard in the immediate vicinity of the bindings leaving the snowboard shovel and tail portions unsupported and thereby allowing unwanted flexing and/or movement during tuning procedures. A further disadvantage of Clarke's system is that each board rest does not seem to have any provision to be readily detached from each support member, so it is necessary to re-mount the entire support apparatus to a supporting work surface each time the apparatus is used which is inconvenient and cumbersome.

Clamping devices that employ one fixed jaw and a second moveable jaw to clamp a ski, bicycle or firearm are known. One such ski clamping device is disclosed in U.S. Pat. No. 3,826,482 to Tourangeau. Such fixed jaw clamps are not ideal for holding a variety of new wider shaped skis as the ski is typically offset relative to the ski support members when clamped and therefore not centered and unstable when resting on the supports.

Also known are various repair stands for holding bicycles employing clamping devices with one fixed jaw and another movable jaw designed to clamp the circular tubing of a bicycle frame or seat post. Most of these stands are placed on a ground support surface and employ a support member extending vertically relative to the ground surface to establish a location to receive a load such as a clamp arm allowing a bicycle to hang off the support structure. A mechanical clamp located at the distal end of the clamp arm is typically employed to hold the bicycle frame top tube or seat post thereby suspending the bicycle above the ground and away from the support structure so as to allow free movement of the bicycle wheels. One such bicycle stand is disclosed in U.S. Pat. No. 5,996,814 to Workman et al. Recent performance enhancing changes to bicycle frames including the introduction of non-circular square, rectangular, oval, asymmetric teardrop and other new aerodynamic frame tubes and seat post cross-sections have made clamping a wide variety of frames difficult and impractical.

A repair stand holding the bicycle forks and bottom bracket shell as disclosed in U.S. Pat. No. 5,497,967 to Gantois addresses some of the problems holding bicycle frames. Gantois describes a folding repair stand allowing a bicycle to be supported by its crank axle holder and fork. Disadvantages to Gantois' stand are apparent as the transversely extending shaft used to mount a fork does not have any provision to be readily detached and/or interchanged with longer or shorter shafts. As rear bicycle wheel axles are typically wider than front bicycle wheel axles it is necessary to utilize at least two different shaft lengths on a support to hold both front and rear bicycle fork ends so maintenance and repair procedures can be performed on the entire bicycle. Also, as a result of recent performance enhancements to the bicycle frame bottom bracket, particularly the introduction of integrated bottom bracket designs where bottom bracket bearings are placed directly in the frame itself, the static crank axle support Gantois describes does not support a wide variety of new bottom bracket shells with non-circular cross sections. Further, Gantois's stand is not height adjustable so as to allow vertical adjustment of the bicycle to bring specific areas of a bicycle into easier reach of the worker, and the generally upright position of the bicycle relative to the stand changes depending on the size of bicycle frame being held which is undesirable when work is performed on a variety of bicycles. In general the bicycle support stands mentioned above are expensive, cumbersome and not very versatile.

A pair of moveably mounted vise jaws such as disclosed in U.S. Pat. No. 3,861,664 to Durkee addresses some problems inherent in fixed jaw clamping devices. Durkee's disclosure describes a ski clamping device employing a spacing member to equalize clamping pressure. Disadvantages with Durkee's disclosure are apparent as the elongated track required to house engagement nuts, vise jaws and the spacing member is difficult to mount, space consuming on a workbench, and not generally portable. Further, Durkee's clamping device does not retract a ski brake when clamping a ski and is not very versatile as no means are provided to hold a ski by the ski binding or hold objects other than skis.

Hence, in addition to a need for a firearm holding apparatus there exists a need to provide an apparatus for securing other sports equipment including skis, snowboards and bicycles in positions such that maintenance work can readily be accomplished. It may also be desirable to have an apparatus that may be used as a tool for a variety of workshop or household functions, rather than just being useful to hold firearms, skis, snowboards and bicycles. Hence, a further need exists in some applications for a ski, snowboard and bicycle apparatus having a high degree of versatility, adjustability, and/or adaptability to other non-ski, snowboard and bicycle uses.

A need therefore exists for an improved firearm holding device. Accordingly, a solution that addresses, at least in part, the above and other shortcomings is desired.

SUMMARY OF THE DISCLOSURE

The present disclosure provides an apparatus for holding sports equipment including firearms, skis, snowboards and bicycles at a work station to facilitate cleaning, maintenance, adjustment, repair and sighting operations.

According to a first aspect of the disclosure, there is provided a holder system for supporting sports equipment. The holder comprises a vise assembly comprising: a vise base; two moveable vise jaws provided with respective vise screw bores and guide bores, the two moveable vise jaws engageable with a first section on the sports equipment; a vise screw extending substantially horizontally through the vise base and oppositely disposing the movable vise jaws through the vise screw bores, and having two sections of threads allowing for movement of the movable vise jaws, the two sections being separated by a thread-free section; and one or more guide bars fixed in a substantially horizontal orientation in the vise base and extending through the respective guide bores.

The holder system may further comprise: a base section adapted to be fixed to a work station and having a substantially vertical aperture; and a rod engaged into the substantially vertical aperture, the rod having an upper portion affixed to the vise assembly.

In the holder system, two moveable vise jaws may each have a flat top surface to allow the sports equipment to be laid flat on top of the two moveable vise jaws.

In the holder system, the rod may be a threaded rod; the base section may be connectable to the threaded rod; and the substantially vertically oriented aperture of the base section may be threaded to receive the threaded rod.

In the holder system, the threaded rod may extend vertically through a vise assembly and may have two reversely disposed sections of threads provided to allow for movement of the vise assembly; the vise base and vise assembly may each have vertically oriented threaded bores formed therein to engage with threads on the threaded rod; and the threaded rod may be rotatable about its longitudinal axis to adjust a height of the vise assembly relative to the vise base.

In the holder system, the base section may further comprise a second set of vise screw bores and guide bores aligned to be able to receive the rod and the one or more guide bars.

In the holder system, the vise screw may further comprise a recessed groove in the middle of the vise screw to accept an external retaining ring acting as a shoulder against walls of a vertical groove extending downward from a top portion of the vise base so the vise screw is held in the substantially horizontal aperture so as to be immovable in the direction of a longitudinal axis of the vise screw but rotatable about the longitudinal axis.

In the holder system, the vise screw and guide bars may be detachably secured to the vise base and are exchangeable with different sizes of vise screws and guide bars to accommodate widths of different firearms held in the vise assembly.

In the holder system, the vise screw may further comprise: a handle assembly fastened to one end of the vise screw, the handle assembly having a handle end cap with an aperture; and a lever transversely and slidably mounted through the aperture, the lever having index finger rings mounted on both of its ends to prevent the lever from becoming detached from the handle assembly.

In the holder system, each of the movable vise jaws may further comprise a recessed stepped indent formed therein to receive and hold pins of varying diameters in a horizontal orientation when the movable vise jaws are closed upon both ends of pin extending between and perpendicular to the movable vise jaws, the pins being fastenable onto bindings of the sports equipment.

The holder system may further comprise an eyebolt anchored by the pins pin to fasten and support the sports equipment resting base up on the holder system when the eyebolt is turned into a threaded insert on the sports equipment.

In the holder system, each of the movable vise jaws may further comprise an oppositely disposed "C" shaped profile allowing a holder support head and a clamp knob to be positioned within the vise assembly between the movable vise jaws when clamping; the profile also allowing the movable vise jaws to hold a ski brake of the sports equipment in a retracted position between the movable vise jaws when clamping the sports equipment with a binding facing base up.

In the holder system, the support head may further comprise a vertical slot located between the movable vise jaws to stabilize the sports equipment in a generally upright position when the support head is rotated about its vertical axis such that said vertical slot is aligned parallel with the movable vise jaws and the sports equipment is located into the slot and clamped between the movable vise jaws.

The holder system may further comprise a support head having: an upper portion defined by a front flange spaced from a rear flange, the support head supporting a second section on the sports equipment; a support tongue disposed between the front and rear flanges, having a recess, mounted for pivotal movement relative to the support head to conform to the sports equipment and having a spring to interact between the support head and the support tongue; and a locking block carried in one of the front or rear flanges, being movable into the recess, and being bias outwardly by the spring.

In the holder system, the sports equipment may be either a ski or a snowboard; and in the support head the upper portion may further comprise an upper portion including a horizontal flat surface, and an elongated slot with an opening at one longitudinal end, the elongated slot having a width sufficient to receive a the sports equipment in a perpendicular orientation to the longitudinal axis of the support to hold the sports equipment in a generally upright position such that the support.

In the holder system, the support head and the vise assembly may be rotated as a unit about the base section.

In the holder system, rotation of the support head and the vise assembly may be permitted through a vertical axis of the holder system such that two opposing longitudinal edges of the elongated slot contact the top and bottom surfaces of the sports equipment to hold the sports equipment in an upright position.

In the holder system, rotation of the support head and the vise assembly may be permitted through a vertical axis of the holder system from a position where the support head is perpendicular to a longitudinal axis of the sports equipment to a position where said support is parallel to the longitudinal axis of the sports equipment.

In the holder system, the support head may be locatable on stationary support under a shovel or tail portion of the sports equipment.

The holder system may further comprise second and third holders in spaced relation to the portable holder, each holder having the vise assembly with the portable holder and the third holder positioned on stationary support under the shovel and tail portions of a ski or snowboard respectively, the second holder positioned between the portable holder and the third holder under the binding portion of said ski or snowboard providing a three-point ski and snowboard support arrangement.

According to another aspect of the disclosure, there is provided an apparatus for holding a ski or snowboard in a fixed horizontal position during base preparation and maintenance which apparatus also employs means permitting the ski or snowboard to be held in a fixed vertical position for edge maintenance procedures.

According to another aspect of the disclosure, there is provided a three-point support arrangement which provides substantial support of the entire ski or snowboard for base and edge tuning and maintenance operations.

According to another aspect of the disclosure, there is provided an apparatus for holding a bicycle in a fixed upright position on or above stationary support such as a work stand to facilitate bicycle cleaning, adjustment, repair and/or replacement operations.

According to another aspect of the disclosure, there is provided an apparatus for holding a firearm in a generally horizontal and fixed position on or above stationary support such as a work stand to facilitate maintenance procedures including inspection, cleaning, repair and sighting.

According to another aspect of the disclosure, there is provided an apparatus that is adaptable for use with a very wide variety of skis, snowboards, bicycles and firearms having different shapes, sizes and construction.

According to another aspect of the disclosure, there is provided an apparatus where sports equipment including skis, snowboards, bicycles and firearms can be readily mounted to or dismounted from the holder.

According to another aspect of the disclosure, a removable mounting system is provided for removably mounting sports equipment including skis, snowboards, bicycles and firearms to a holding apparatus, the apparatus being adapted to be mounted to a wide variety of tables, work stations and support stands.

According to another aspect of the disclosure, there is provided a sports equipment holding apparatus that is compact and readily portable.

According to another aspect of the disclosure, there is provided an apparatus having a high degree of versatility, adjustability, and/or adaptability to other non-ski, snowboard, bicycle and firearm uses.

According to another aspect of the disclosure, there is provided a portable holder for use in spaced relation with a similar holder as a ski, snowboard, bicycle and firearm support for maintenance operations at a work station, the holder being adapted to support one of the opposing end portions of the ski, snowboard, bicycle or firearm. The portable holder comprises a base section adapted to be fixed to the work station in a generally upright position and a rod portion mounted to the base section in a generally upright and vertical orientation. A support head mounted upon the rod allows a variety of modular supports, platforms and brackets to be removably mounted to the support head including ski and snowboard supports, bicycle fork mounting brackets, bicycle bottom bracket shell supports and gun cradles. The rod may be threaded.

According to another aspect of the disclosure, there is provided a portable holder for use in spaced relation with a similar holder as a ski and snowboard support, the holder being adapted to support one of the opposing end portions of the ski or snowboard. The portable holder comprises a base section adapted to be fixed to the work station in a generally upright position and a threaded rod portion mounted to the base section in a generally upright and vertical orientation. A support head mounted upon the threaded rod allows a ski and snowboard support to be mounted to the holder. The ski and snowboard support typically has a resilient top surface to frictionally engage the ski or snowboard when resting thereon and includes a vertical slot for holding both a ski and snowboard in a generally upright position to permit convenient side edge work. The vertical slot of the support is of a sufficient width that when either a ski or snowboard is placed upright in the slot the ski and snowboard support, support head and threaded rod portion of the holder can be rotated as a unit about the base section of the holder and the holders' vertical axis such that two opposing longitudinal edges of the slot act to clamp the ski or snowboard in a fixed upright position. A nut on the lower portion of the threaded rod turned against the top portion of the base allows the ski and snowboard support, support head and threaded rod portion of the holder to be fastened to the base section in the desired orientation preventing unwanted movement of the ski or snowboard when performing side edge tuning procedures. The ski and snowboard support, support head and threaded rod portion of the holder can also be rotated about the holders vertical axis to adjust the height of the support relative to the holder base section, or to change the orientation of the support from a position where the support is aligned across the width of a snowboard to a position where the support is aligned with the longitudinal axis of a ski. The ski and snowboard support is preferably mounted to the support head of the holder for movement between a position where the support is generally horizontal to one where the support is generally vertical, allowing the support to pivot between horizontal and vertical positions to adjust to various degrees of ski camber when the support is aligned under the longitudinal axis of a ski. A locking system is provided for locking the ski and snowboard support to the support head of the holder in either a fixed horizontal or vertical position.

According to another aspect of the disclosure, there is provided a portable holder typically positioned in spaced relation along the edge of a tabletop, work station or support such that the first holder is placed under or in close proximity to a bicycle frame bottom bracket shell and the second holder is positioned under either the front bicycle dropout or rear bicycle dropout. In this manner the proximity of the holders in relation to each other can be easily and independently adjusted according to bicycle frame size. The first holder comprising a bottom bracket shell support is typically positioned in close proximity to one corner of the tabletop, work station or support so as to allow either the front or rear bicycle wheel sufficient clearance off the table or stand to spin freely, and the holder is of a sufficient height so as to allow the bicycle crank arms and pedals sufficient clearance above the tabletop, work station or support to rotate without impediment. The bottom bracket shell support preferably has a "V" shaped profile allowing a wide variety of bottom bracket shell diameters and shapes to be cradled by the support and typically has a resilient top surface to frictionally engage the bicycle bottom bracket shell when resting thereon. The bottom bracket shell support is preferably mounted to the support head of the holder for movement between a position where the support is generally horizontal to one where the support is generally vertical, allowing the support to pivot between horizontal and vertical positions to accommodate various frame shapes in the vicinity of the bottom bracket shell, and a locking system is provided for locking the bottom bracket shell support in either the horizontal or vertical position. The first holder preferably comprises a retaining strap associated therewith to hold a bicycle frame bottom bracket shell against bottom bracket shell support, the strap being looped around and tensioned against the portion of the bicycle frame where the down tube and seat tube meet the bottom bracket shell. Mounts are provided to readily detachably mount various bicycle axles transversely through the support head of the second holder to permit fastening of a wide variety of front and rear bicycle fork ends to the holder.

According to another aspect of the disclosure, there is provided a vise assembly for use with the portable holder adapted to be mounted upon the threaded rod portion of the holder or fixed directly to a work station and used in spaced relation with similar holder(s), or in combination with the variety of modular supports, platforms and brackets described above. A vise base including a perpendicular threaded aperture allows the threaded rod of the holder to be turned into the threaded aperture of the vise base permitting mounting of the vise assembly to the threaded rod portion of the holder. A vise screw extending horizontally through the vise base with two reversely threaded sections drives oppositely disposed vise jaws toward and away from each other along at least one guide bar with the vise jaws sliding exactly parallel to each other when the vise screw is turned. The vise screw is turned by a handle assembly fastened to one end of the vise screw including a lever transversely and slidably mounted through an aperture in a handle end cap. Index finger rings mounted on each end of the lever act to prevent the lever from becoming detached from the handle assembly and allow for quick and efficient manual rotation of the handle assembly and vise screw when an index finger is placed through, or partially through, one of the index finger rings. The handle end cap is of a larger diameter than the vise screw and acts as a stop preventing the vise jaws from winding off the vise screw when vise jaws are actuated away from each other. Both vise screw and guide rod(s) are preferably detachably secured to the vise base in order to be readily exchanged with a longer or shorter vise screw and guide bar(s) depending on the width of ski, snowboard, bicycle, firearm or other sports equipment to be held in the vise assembly. Each oppositely disposed vise jaw forms a "C" shaped profile allowing a holder support head, clamp knob or a ski binding to be positioned within the vise assembly between the vise jaws when clamping. Each of the vise jaws preferably includes a recessed stepped indent to receive and hold pins of varying diameters and lengths when two oppositely disposed vise jaws are closed upon both ends of a pin extending between and perpendicular to the vise jaws. Diameters of pins are held onto which certain types of cross country, touring and backcountry touring ski bindings are fastened with the pins also able to provide anchor for an eyebolt used to fasten and support a snowboard resting base up on the holder when the eyebolt is turned into one of the snowboard threaded inserts. A flat surface exists on the top of each vise jaw allowing the vise assembly to act as a rest in addition to having clamping ability. The vise jaws are actuated towards each other to clamp either a ski or snowboard in a vertical orientation, or actuated a sufficient distance away from each other to provide stable support for a ski or snowboard resting horizontally on the flat top surface of the vise jaws. The vise assembly is able to be rotated such that the vise jaws can be positioned in line with the longitudinal axis of the ski so as not to interfere with base rilling, structuring and/or imprinting tools with vertically disposed flanges of a thickness greater than the thickness of a ski or snowboard when drawn down the ski or snowboard base as required when the ski or snowboard is resting base up. The vise jaws are typically provided with resilient jaw pads, each jaw pad covering the entire top portion of each vise jaw and shaped such that each pad is mechanically held in place against the vise jaw when clamping so as not to become detached from the vise jaw. The jaw pads are preferably made of a resilient material such as rubber so as not to dent, mar or otherwise damage the sports equipment including for instance the ski, snowboard, bicycle or firearm being clamped.

According to another aspect of the disclosure, there is provided a portable holder typically positioned in spaced relation along the edge of a tabletop, work station or support such that a first holder is placed under or in close proximity to the shovel portion of a ski or snowboard, a second holder is positioned under the binding area and a third holder is positioned under or in close proximity to the tail portion of a ski or snowboard providing an improved three point ski and snowboard support arrangement. Each of the three holders is provided with vise assemblies as described above. The first and third holders positioned under or in close proximity to both shovel and tail portions of the ski or snowboard are each equipped with support heads mounted upon the threaded rod portions of each holder. A vertical slot in each support head serves to stabilize a snowboard in a generally upright position when the support head is rotated about its vertical axis such that the vertical slot is aligned parallel with the vise jaws and the snowboard is dropped down into the slot and clamped between the vise jaws to permit convenient side edge tuning. The support head of each holder also acts as a rest for a ski placed upright on the support head then clamped between the vise jaws when the support head is rotated about its vertical axis such that the vertical slot is perpendicular to the vise jaws, thereby allowing the vise jaws to clamp the ski relatively close to its bottom edge allowing work to be done on the top edge of the ski without obstruction from the vise jaws. A ski is held either base up for base tuning or base down to facilitate binding mounting by clamping the sides of the ski in the binding area using the second holder and resting the shovel and tail portions of the ski on the top portion of the vise jaws of the first and third holders. When holding skis having an alpine binding the second holder is positioned directly under the binding ski brake. The opposing "C" shape of each vise jaw provides an open area under each jaw pad allowing the ski brake to be first retracted then held in a retracted position by the vise jaws when either the sides of a ski or ski binding are clamped by the vise jaws. In this respect the vise jaws of the second holder serve the dual purpose of clamping the ski or ski binding and retracting the ski brake. When holding skis having a binding of the Nordic variety, that is to say a binding that closes on a pin in order to fasten a ski boot to a ski, an additional mounting option exists where the vise jaws of the second holder include stepped indents to receive and hold pins of varying diameters and lengths when the two oppositely disposed vise jaws are closed on both ends of a pin placed in a perpendicular orientation between the vise jaws. At least three diameters of pins may be held in progressively smaller diameter stepped indents in each vise jaw onto which both New Nordic Norm (NNN) and Salomon Nordic System (SNS) cross country, and other touring and backcountry touring ski bindings may be fastened. To hold a snowboard base up the vise jaws of the first and third holders are actuated far enough away from each other so the top surface of the four vise jaws act as a stable four-point rest upon which the snowboard can be placed. An eyebolt turned into one of the snowboard threaded inserts can be anchored to the second holder by placing one of the pins mentioned above through the eyebolt and closing the oppositely disposed vise jaws on both ends of the pin. The threaded rod of the second holder is provided with two reversely disposed sections of threads to permit convenient height adjustment of the vise assembly relative to the base section of the holder when the vise assembly is held in position and the threaded rod is turned either clockwise or counter-clockwise, allowing the height of the vise assembly to be readily adjusted relative to the snowboard without the need to rotate either vise assembly or eyebolt. A nut or knob on the lower portion of the threaded rod turned against the top portion of the base allows the threaded rod portion of the holder to be fastened to the base in a fixed position once the holder has been adjusted to the desired height.

According to another aspect of the disclosure, there is provided a vise assembly that is mounted to the threaded rod portion of both a first holder and a second holder, each holder positioned in spaced relation along the edge of a tabletop or support such that the first holder is placed under or in close proximity to a bicycle frame bottom bracket shell and the second holder is positioned under either the front bicycle dropout or rear bicycle dropout. The vise assembly of each holder is orientated such that the vise jaws are transversely positioned relative to the length of the tabletop or support on which the supports are fastened. The vise jaws of the first holder can then be adjusted to allow the bicycle bottom bracket shell to be seated upon the top portion of both jaws in a stable manner. The first holder preferably comprises a retaining strap associated therewith to hold a bicycle frame bottom bracket shell against the top portion of the vise jaws, the strap being looped around and tensioned against the portion of the bicycle frame where the down tube and seat tube meet the bottom bracket shell. A horizontal "V" shaped groove exists in the clamping surface of each vise jaw allowing for convenient horizontal clamping of a wide variety of bicycle axles with circular cross sections in the vise jaws of the second holder, thereby allowing the front or rear bicycle dropout to be securely fastened to the second holder.

According to another aspect of the disclosure, there is provided a vise assembly in which the opposing vise jaws include apertures where resilient rubber frame pads are inserted to facilitate clamping a very wide variety of bicycle frames between the opposing vise jaws of the vise assembly. Each frame pad preferably has a "V" shaped profile allowing a very wide variety of bicycle frame tube diameters and shapes to be cradled between and held within the angled flanges of the frame pads. The frame pads are preferably made of a resilient rubber material to prevent damage to the bicycle frame and provide for good frictional engagement therewith. The vise assembly is mounted transversely on the vertically orientated threaded rod of the holder with the threaded rod turned into a corresponding threaded aperture in vise base. In this manner the vise assembly is positioned in a generally horizontal orientation with the longitudinal axis of opposing vise jaws parallel with the tabletop or support allowing vise jaws of the vise assembly to both clamp the top tube of the bicycle frame and act to suspend the bicycle a sufficient distance off the tabletop and above the ground to facilitate bicycle maintenance, adjustment or repair. Alternatively the vise assembly can be mounted transversely on the vertically orientated threaded rod of the holder through a second threaded aperture in the vise base, positioning the vise assembly in a generally horizontal orientation, but with the vise jaws perpendicular to the tabletop. In this orientation the opposing vise jaws are able to clamp the vertically orientated seat tube of the bicycle frame, thereby holding the bicycle sufficiently off the table and above the ground to facilitate bicycle maintenance, adjustment and repair operations thereon.

BRIEF DESCRIPTION OF DRAWINGS

Further features and advantages of the embodiments of the present disclosure will become apparent from the following detailed description, taken in combination with the appended drawings, in which:

FIG. 27 is a side elevation view of a holder in accordance with the disclosure with a gun barrel cradle being shown mounted to the support head of the holder in the horizontal position, in accordance with an embodiment of the disclosure;

FIG. 28 is a section view on the line 3-3 of FIG. 24 showing a locking block/pull assembly in the support head of the holder in the locked position, locking the support and compressing both flanges of the holder support head against the tongue of the support in the horizontal position, in accordance with an embodiment of the disclosure;

FIG. 29 is a section view on the line 3-3 of FIG. 24 showing the block/pull assembly in the support head of the holder in the unlocked position, allowing the support to pivot on the round axle portion of the locking block, in accordance with an embodiment of the disclosure;

DETAILED DESCRIPTION OF THE EMBODIMENTS

Figure 1:
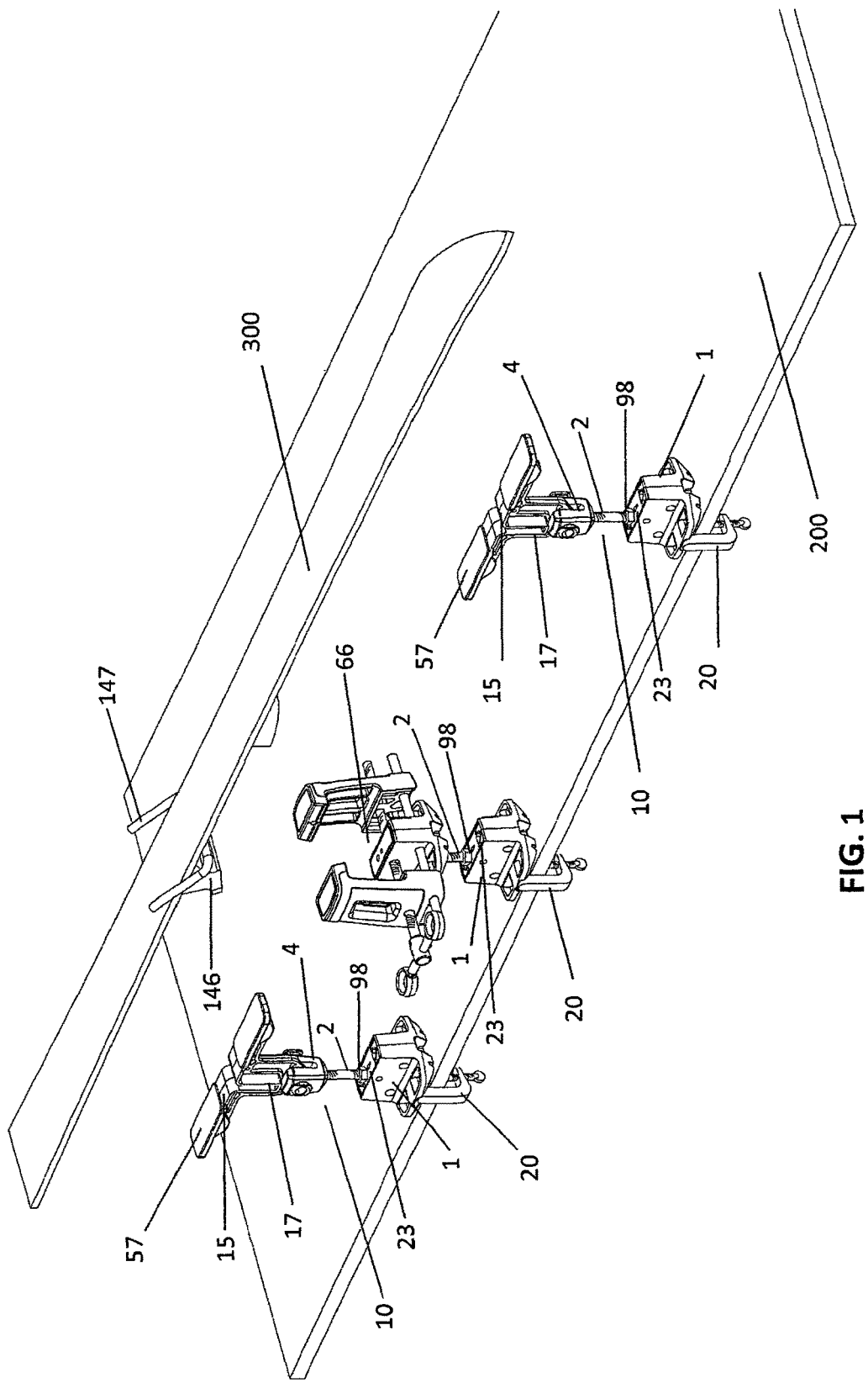
FIG. 1 is a perspective view illustrating a pair of holders with a third holder comprising a vise assembly between the pair of holders, each holder clamped to a table or work bench in spaced relation with a ski shown in a raised position above the holders, in accordance with an embodiment of the disclosure.

The description which follows and the embodiments described therein are provided by way of illustration of examples of particular embodiments of the principles of the present disclosure. These examples are provided for the purposes of explanation and not limitation of those principles and of the disclosure. In the description which follows, like parts are marked throughout the specification and the drawings with the same respective reference numerals.

Briefly, an embodiment provides a holder of an article of sports equipment. Representative sports equipment includes, but is not limited to a ski, snowboard, bicycle and firearm (such as a gun, rifle, shotgun, pistol, crossbow, etc.). An embodiment may also be used to hold other items and articles, such as building materials, construction tools, etc. For an embodiment, the holder provides support for maintenance operations of the held device at a work station (such as a work stand, work bench, tabletop, etc.). In one embodiment, the holder is portable and comprises a base section that can be used to support either a support head or adapted to be fixed to the work station in a generally upright position and a rod portion mounted to the base section in a generally upright and vertical orientation. A support head mounted upon the rod allows a variety of modular supports, platforms and brackets to be removably mounted to the support head including sports equipment such as ski and snowboard supports, bicycle fork mounting brackets, bicycle bottom bracket shell supports and gun cradles. Further details on aspects of embodiments are provided below.

Referring firstly to FIG. 1, which illustrates one embodiment, there is shown a pair of portable holders 10 for use in spaced relation with one another as a ski 300, snowboard 400, bicycle 500, gun 600, or pipe 700 support for maintenance operations being carried out at a work station 200.

Each holder 10 comprises a base section 1 adapted to be fixed to the work station 200 in a generally upright position. A threaded rod 2 is turned into threaded aperture 3 in base section 1 in order to mount threaded rod 2 to base section 1 in a generally vertical orientation. A support head 4 is mounted to the uppermost portion of the threaded rod 2. A variety of modular supports, platforms and brackets can be removably mounted to the support head including ski and snowboard support 15, bicycle fork mounting bracket 14, bicycle bottom bracket shell support 16 and gun barrel cradle 44. By virtue of the threaded rod 2 and support head 4 arrangement, the holders 10 can be readily converted to mount a very wide variety of sports equipment including skis 300, snowboards 400, bicycles 500 and guns 600. Further details of the holder configuration and construction will be described hereinafter. According to one embodiment, the rod 2 may be coupled to the base section 1 by friction fit, other suitable means, etc. According to one embodiment, the holders 10 may be mounted to the work station 200 by bolts, other suitable clamps, etc. It will be appreciated that in other embodiments, threaded rod 2 and threaded aperture in base section 1 may be replaced with a friction fit rod that has a clamping and/or locking mechanism that allows for the adjustment of height for brackets and/or the locking of brackets at a given position and/or orientation. Other height adjustment and/or locking mechanism may be used as known to a person of skill in the art.

Figure 26:
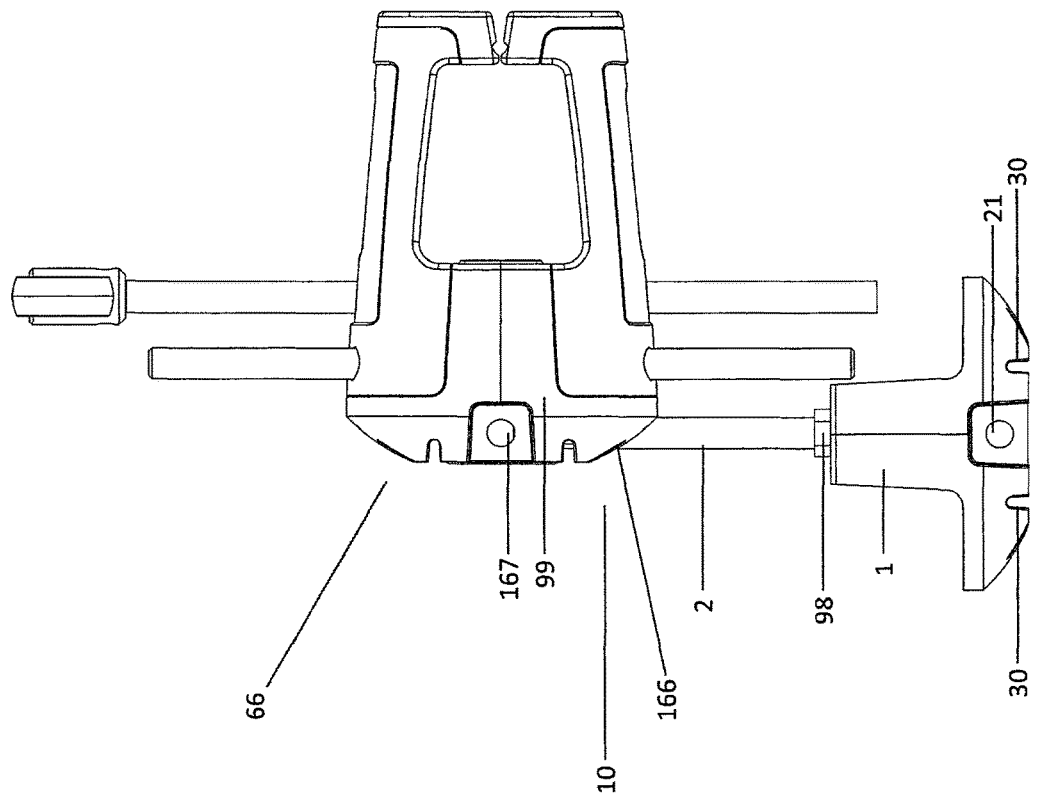
FIG. 26 is a side elevation view of a holder in accordance with the disclosure showing one holder comprising a vise assembly mounted transversely on the vertically orientated threaded rod and base section of the holder, in accordance with an embodiment of the disclosure.
Figure 30:
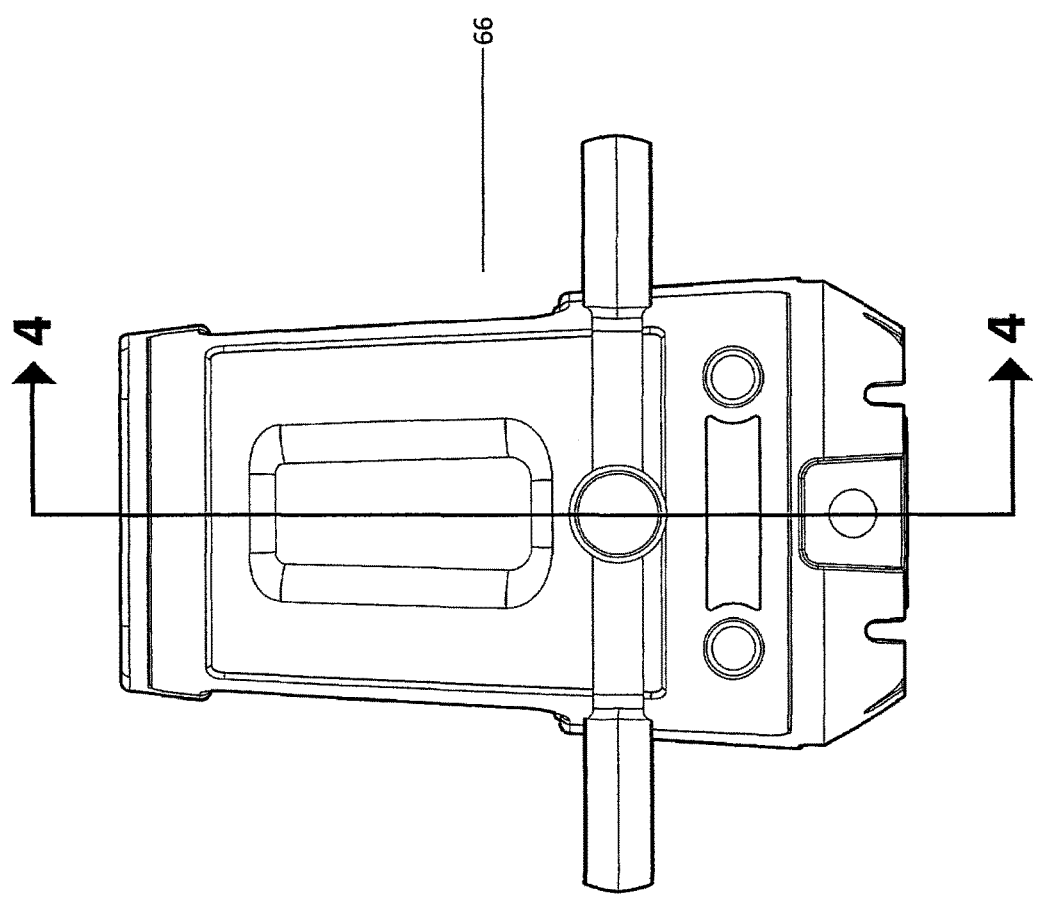
FIG. 30 is a front elevation view of the vise assembly of the holder in accordance with the disclosure, in accordance with an embodiment of the disclosure.

As shown in FIG. 1, the holders 10 are mounted to a bench or work station 200 by means of C-clamps 20. As shown in FIG. 27, according to one embodiment, the base sections 1 of the holders 10 are provided with convenient apertures 21 extending above and parallel to the base bottoms thereby to receive the upper legs of the C-clamps 20 to permit convenient clamping to the work station or, as shown in FIG. 26, to permit convenient horizontal mounting and height adjustment of a vise assembly 66 on the threaded rod 2 by turning threaded rod 2 into corresponding threads (not shown) in apertures 21.

Figure 18:
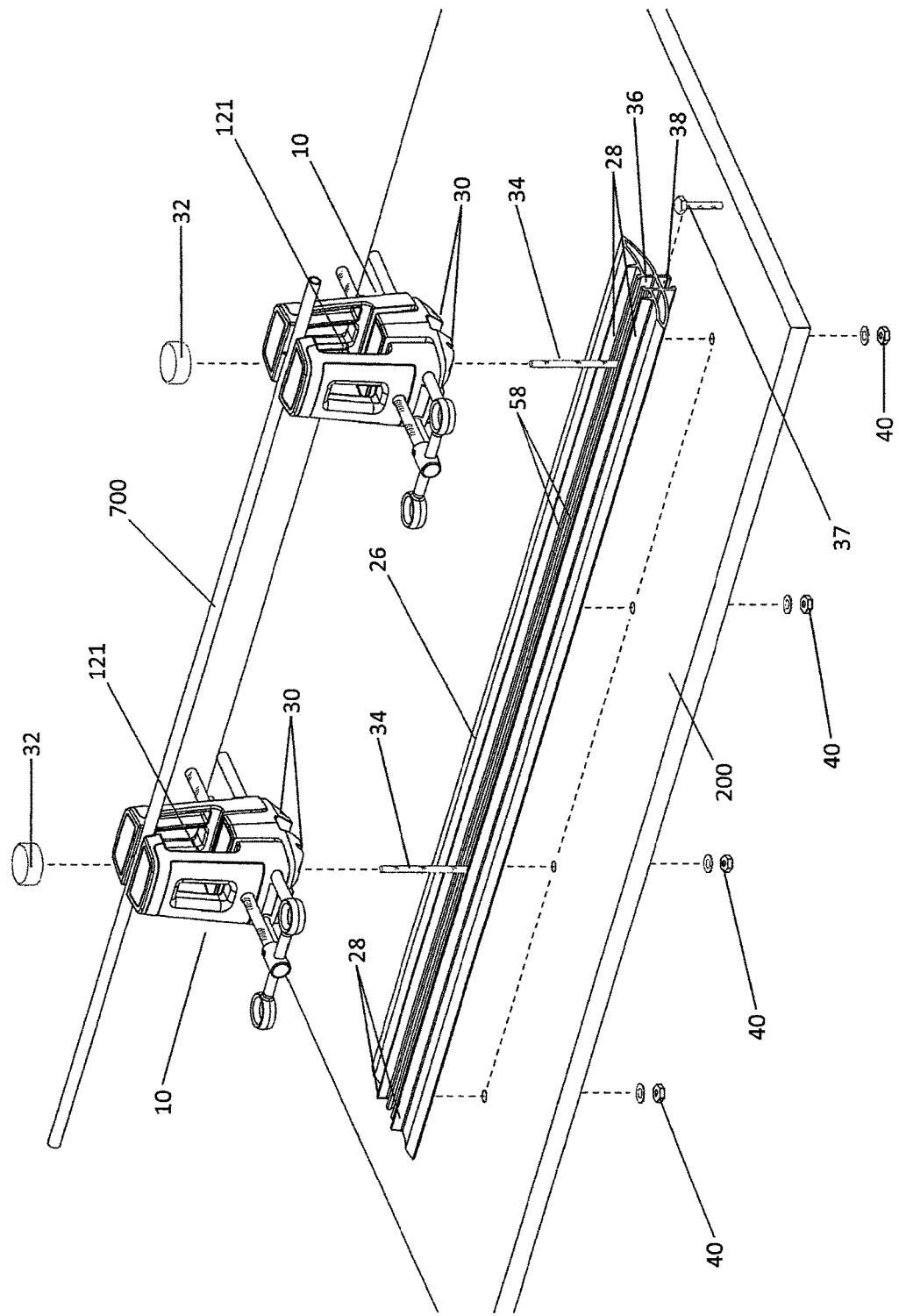
FIG. 18 is a perspective view showing the holders in positions ready to be secured to an optional support rail, which support rail is adapted to be fixed to a work bench or table, in accordance with an embodiment of the disclosure.
Figure 19:
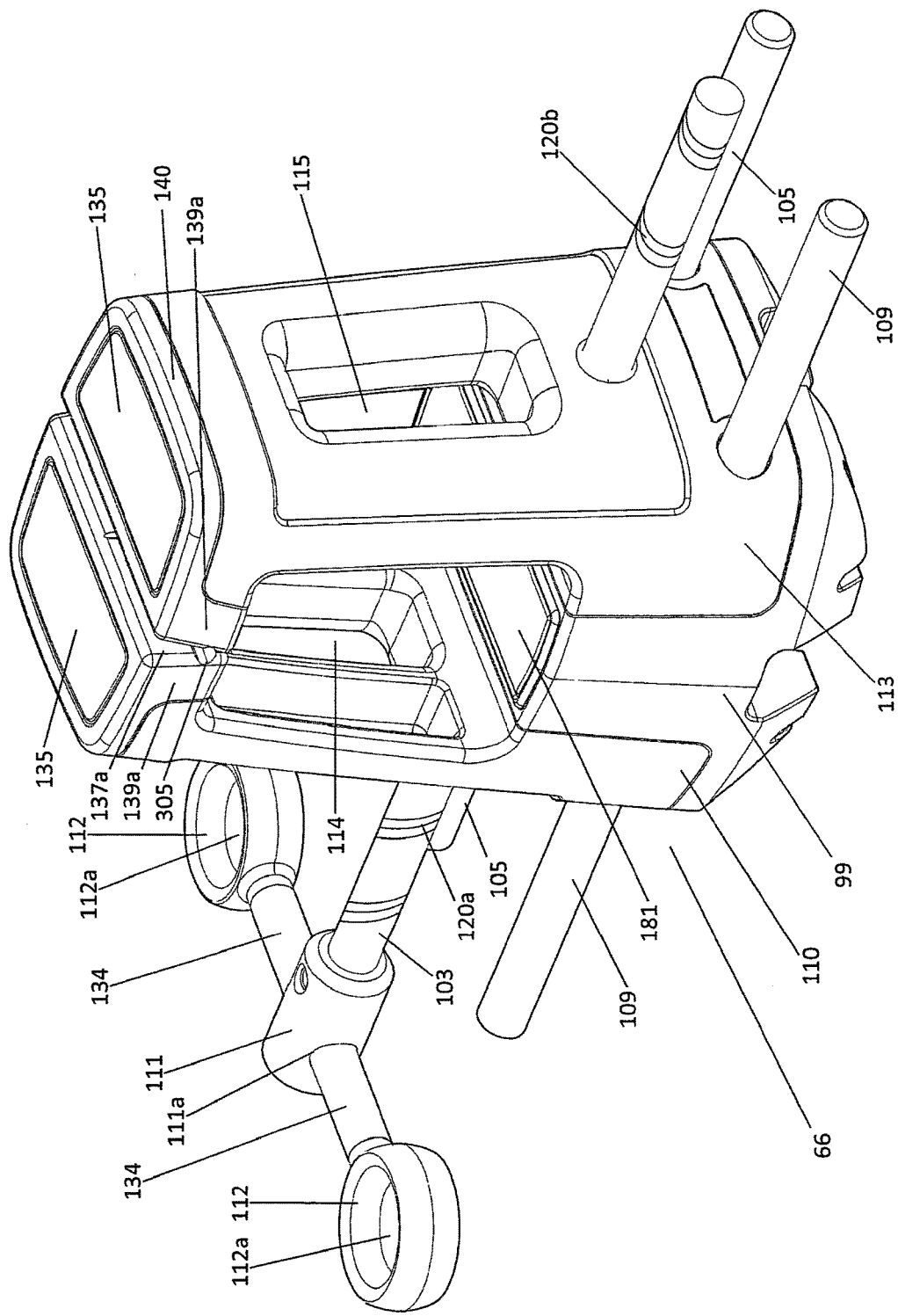
FIG. 19 is a perspective view illustrating the vise assembly of the holder, in accordance with an embodiment of the disclosure.

As shown in FIG. 18, according to one embodiment, the holders 10 are mounted to an elongated support rail 26 having a multiplicity of ribs 28 on is upper surface which interface with spaced grooves 30 provided in the bottom of the holder base sections 1 thereby preventing unwanted rotation of the holders 10 about their vertical axes. Mounting knobs 32 co-operate with headed adjustment screws 34 located within the upper center dove-tail groove 36 of the support rail 26 thereby to enable the holders 10 to be slid toward and away from one another and then tightened at the desired distance from each other thereby to accommodate the length of the ski 300, snowboard 400, bicycle 500, firearm 600 or pipe 700 to be worked on. According to one alternative embodiment (not shown), the threaded rod 2 of the holders 10 may also be mounted directly to the support rail 26 by turning the threaded rod 2 into a nut located within the center dove-tail groove 36 of the support rail 26, then tightening a second nut threaded onto the threaded rod 2 against the inner top surface 58 of the support rail 26. The support rail 26 is, in turn, affixed to the table 200 by means of suitable fasteners including headed adjustment screws 37 located within the lower center dove-tail groove 38 of the support rail 26 and nuts 40 located under the tabletop or work station 200.

Figure 23:
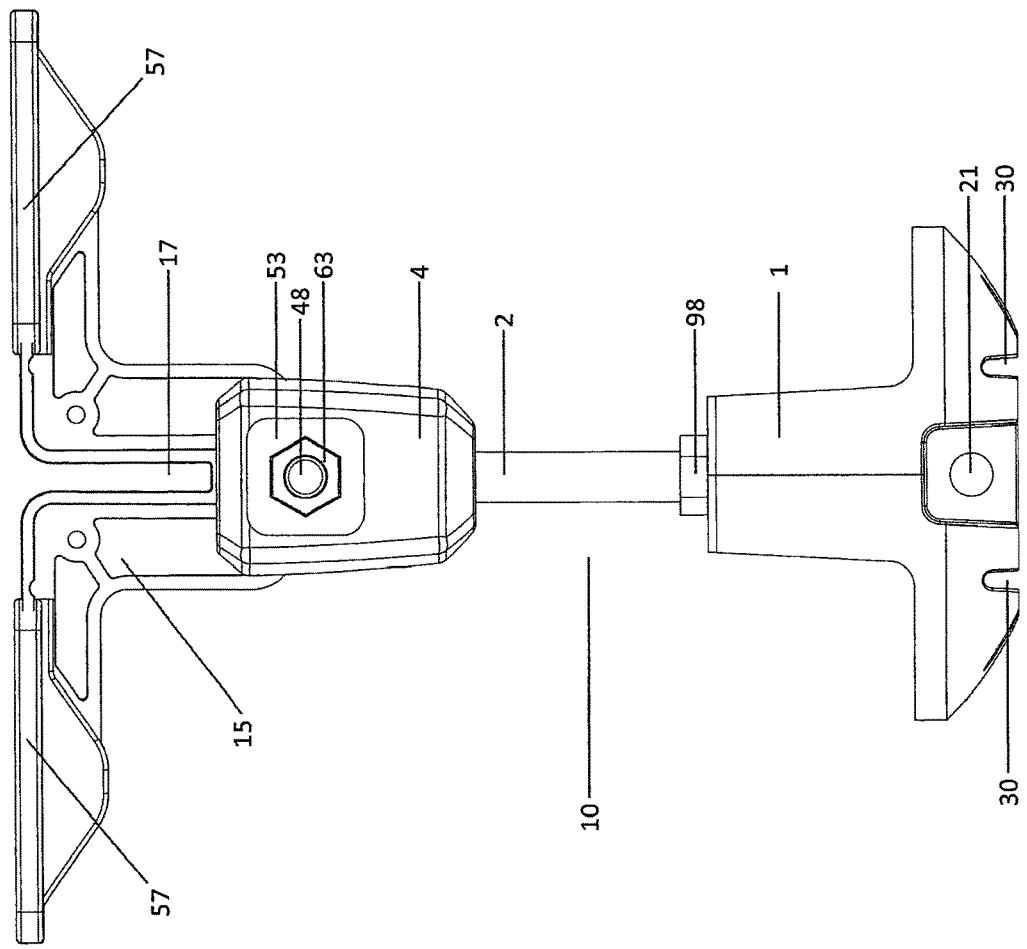
FIG. 23 is a front elevation view of a holder in accordance with the disclosure with a ski and snowboard support being shown mounted to the support head of the holder in the horizontal position, in accordance with an embodiment of the disclosure.
Figure 24:
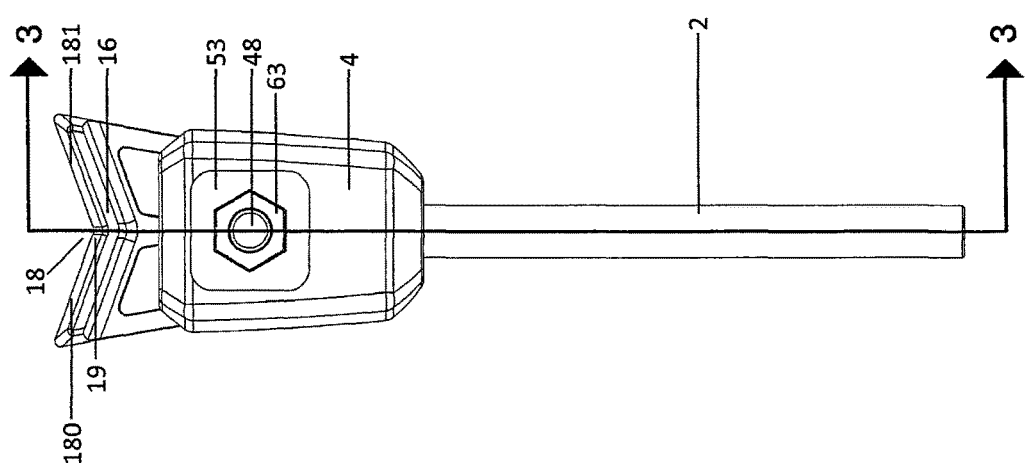
FIG. 24 is a front elevation view in accordance with the disclosure with a bicycle bottom bracket shell support being shown mounted to the support head of the holder in the horizontal position, in accordance with an embodiment of the disclosure.

Reference will now be had to FIGS. 23, 24 and 27, which show a ski and snowboard support 15, bicycle bottom bracket shell support 16, and gun barrel cradle 44 mounted to the support head 4 of the holder 10, according to one embodiment. The support head 4 itself is preferably made from a sturdy plastics material which may or may not be reinforced with glass fibers to provide the necessary strength and rigidity. According to one embodiment, the support head 4 may be made from metal, other suitable materials, etc. A vise base 99 including a perpendicular threaded aperture 101 allows the threaded rod 2 to be turned into threaded aperture 3 (not shown) of the base section 1 to permit both mounting of the support head 4 to the base section 1 of the holder 10 and convenient height adjustment of the support head 4 relative to base section 1. According to one embodiment, the threaded rod 2 of the holder 10 is made of steel or stainless steel with threads of the ACME variety. According to one embodiment, the threaded rod 2 may be made from metal, other suitable materials etc. and may include another suitable thread pattern. As shown in FIGS. 28 and 29, according to one embodiment, the support head 4 is preferably molded or cast on the end portion 24 of threaded rod 2, with the end portion 24 having a recessed groove 25 and a partial round shape 26 milled into one side of threaded rod 2 providing mechanical means to prevent support head 4 from rotating or otherwise becoming detached from threaded rod 2.

Figure 34:
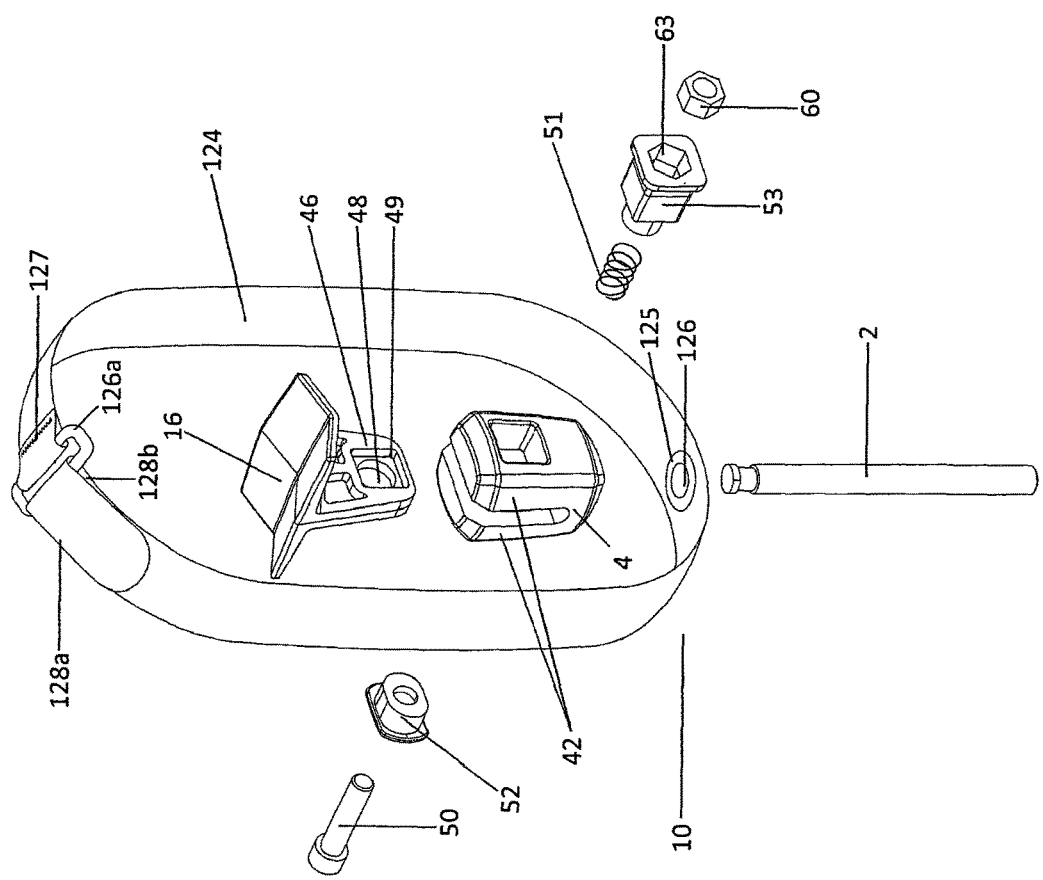
FIG. 34 is an exploded perspective view of the support head of a holder and associated components in accordance with an embodiment of the disclosure.

As shown in FIGS. 28-29 and 34, according to one embodiment, approximately the upper two thirds or so of the support head 4 include a spaced apart generally parallel pair of wide but relatively thin flanges 42. The previously mentioned ski and snowboard support 15, bicycle bottom bracket shell support 16, and gun barrel cradle 44 each have affixed a support tongue 46 sized so as to fit between the two flanges 42 noted above of the support head 4. The lower corners of the support tongue 46 are arcuately curved at 54 and 55. Each support tongue 46 has an aperture 48 in it, with a recess 49 surrounding aperture 48 and through which aperture 48 passes an adjustment socket head screw 50, which screw passes through the two flanges 42 of support head 4, through coil spring 51, through a locking block 53, and into a pull 52 behind which is the spring-biased locking block 53. Locking block 53 is non-rotatably and slidably mounted for movement in rear flange 42 (on the left in FIGS. 28-29) and is shaped to compliment the shape of aperture 48 and recess 49. It will be appreciated that other mechanical arrangements including a wide variety of shape variants of locking block 53 and complementing recess 49 including for instance square, hex, star, etc., may be employed to lock support tongue 46 in a plurality of positions when support tongue 46 is pivoted within support head 4 between positions where the support tongue is in a generally horizontal orientation to a position where the support tongue is generally vertical. It will be appreciated that the degree to which the locking block complements the recess may vary in different embodiments. Socket head screw 50 is tightened when turned through nut 60 captivated in slot 63 of locking block 53 to move locking block 53 inwardly to lock the support in position, or loosened to allow locking block 53 to be pushed outwardly by the spring 51 to move it clear of the recess 49 in tongue 46 allowing for pivotal movement of the support about the horizontal axis of support head 4. The frontal flange 42 (on the right on FIGS. 28-29) includes an aperture 69 and recess 70 permitting the pull 52 to be rotatably and slidably mounted to support head 4 by socket head screw 50 for movement from a position where pull 52 is inserted in recess 70 allowing locking block 53 to be pushed outwardly by the spring 51 to move it clear of the recess 49 in tongue 46 to a position where pull 52 is pulled out and clear of recess 70 then turned 90 degrees and seated in stepped indents 73 to move locking block 53 inwardly to lock the support in position. Locking block 53 has an integrated projecting rim 57 that comes in contact with the outside surface of rear flange 42 when the locking block 53 is moved inwardly and acts to compress both flanges 42 against the support tongue 46 when pull 52 is inserted in recess 70 or seated in stepped indents 73 and the adjustment socket head screw 50 is turned to clamp and secure the support (e.g., support 16).

Figure 3:
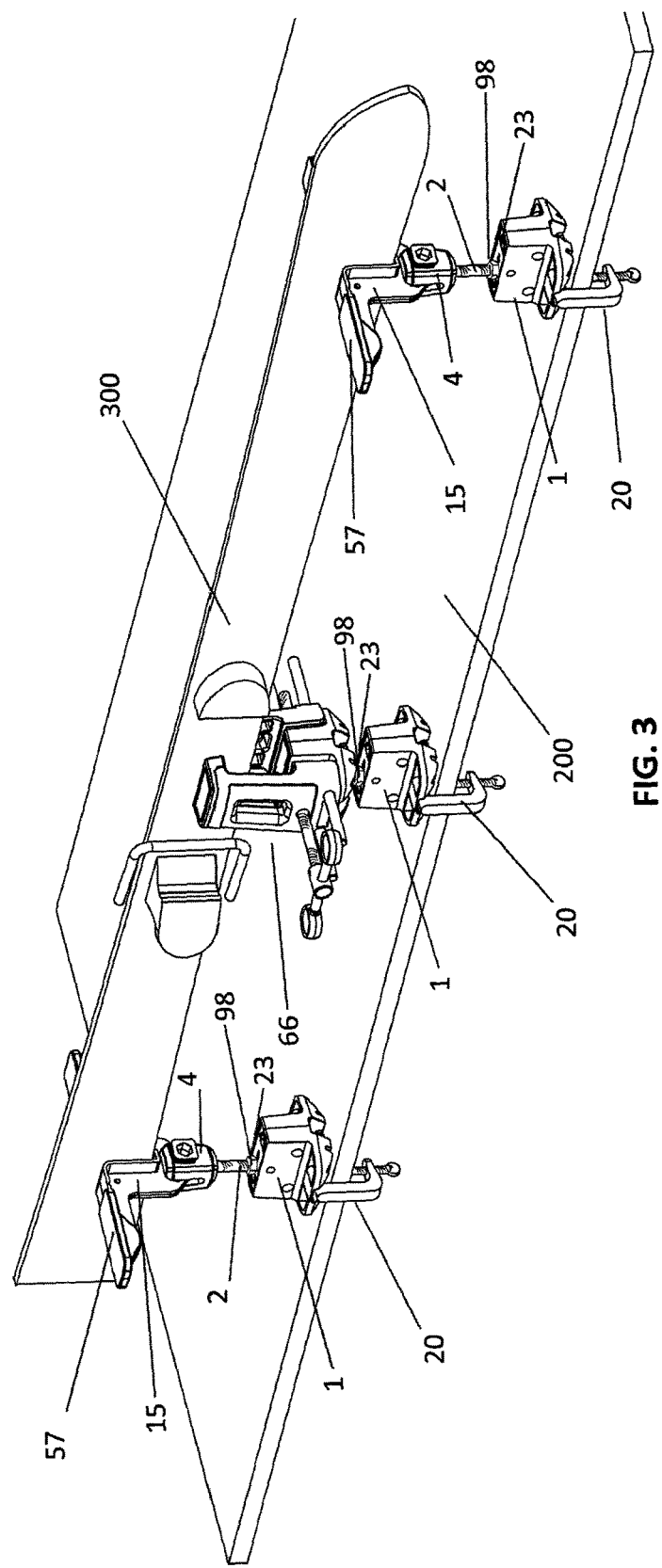
FIG. 3 is a perspective view showing the same holders clamped to a work bench but with the ski having been moved into a vertical orientation and held in the vertical slots of the holders for ski edge maintenance, in accordance with the embodiment of the disclosure.
Figure 4:
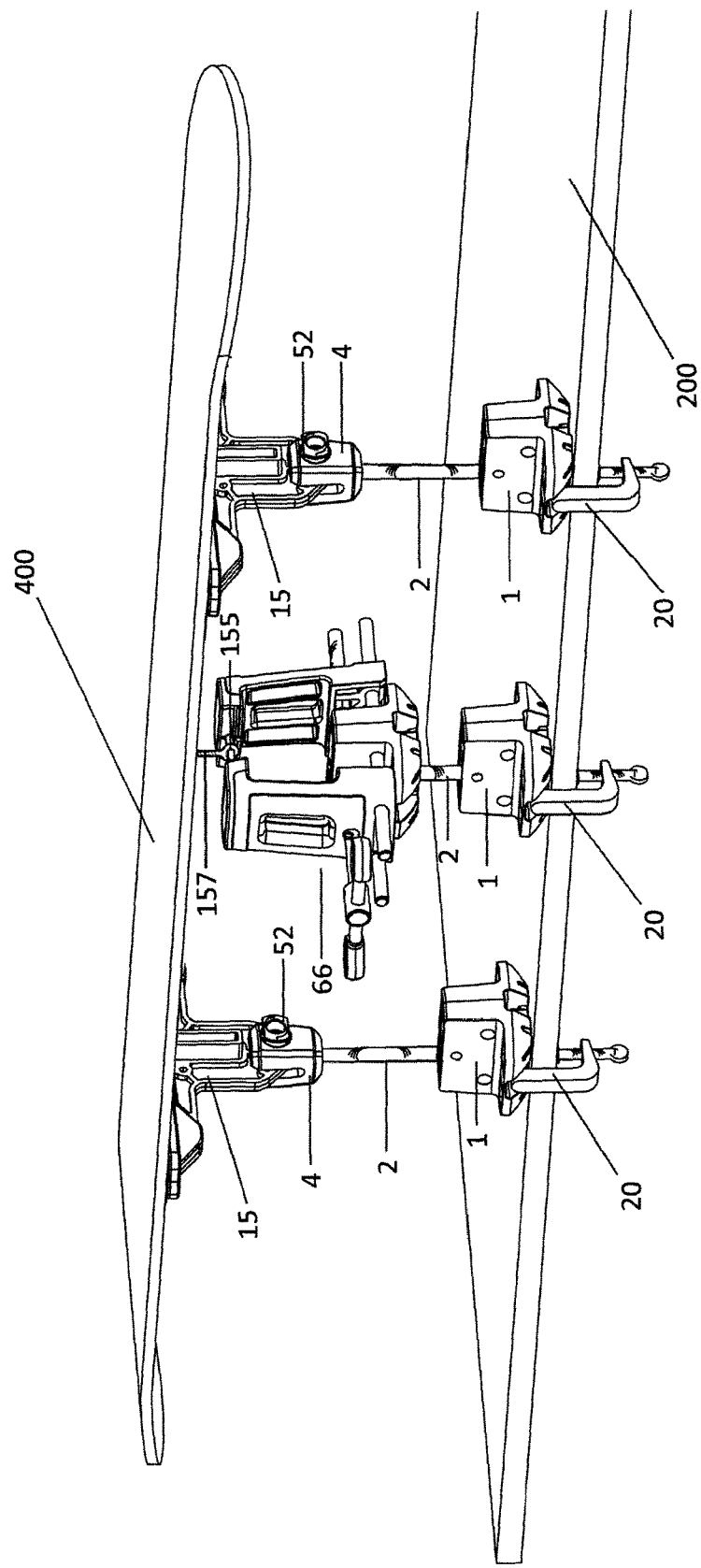
FIG. 4 is a perspective view showing a snowboard positioned upon the holders for snowboard base preparation/maintenance, anchored by an eyebolt turned into one of the snowboard threaded inserts, in accordance with the embodiment of the disclosure.
Figure 5:
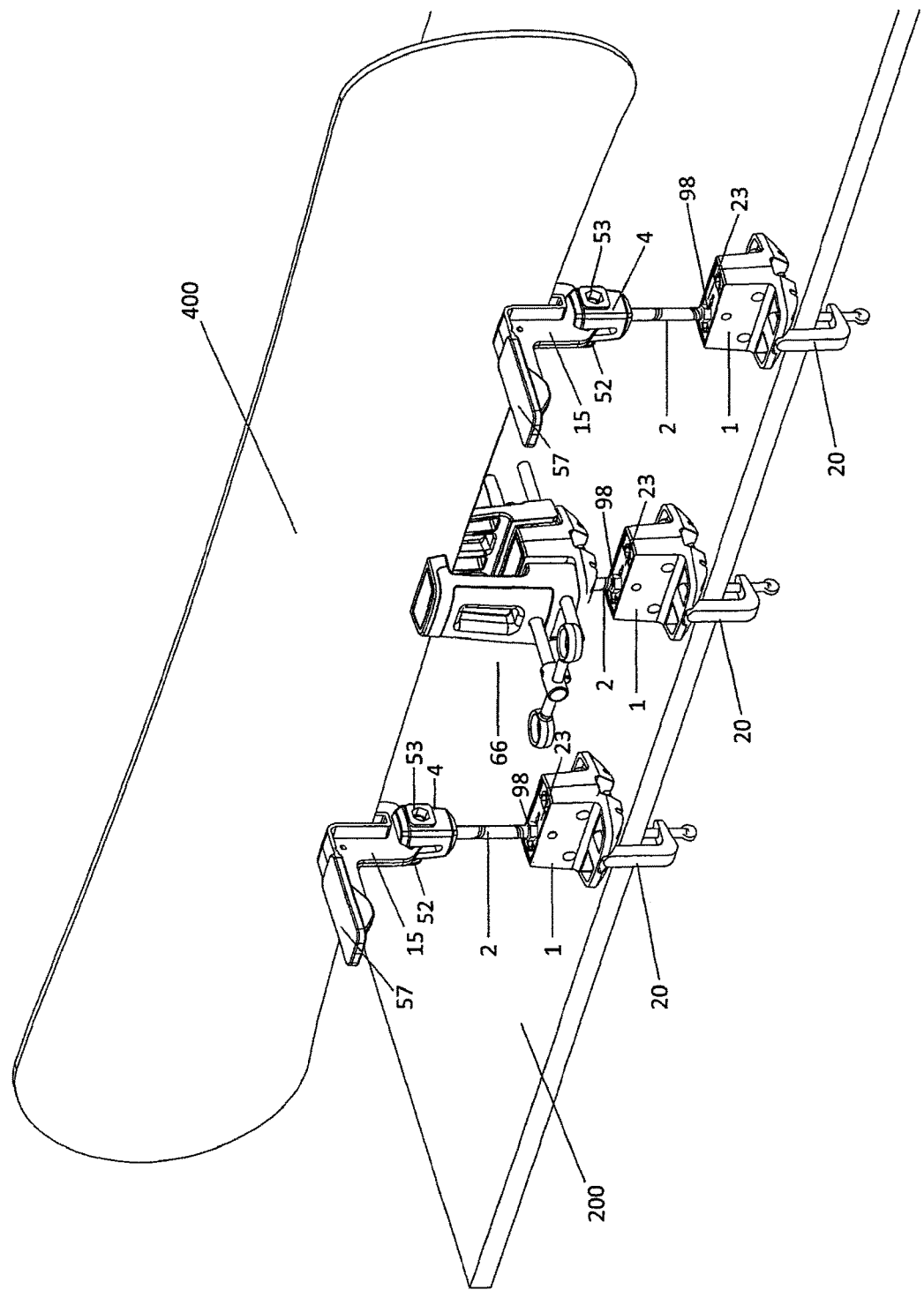
FIG. 5 is a perspective view showing the same holders clamped to a work bench but with the snowboard having been moved into a vertical orientation and held in the vertical slots of the holders for snowboard edge maintenance, in accordance with an embodiment of the disclosure.
Figure 6:
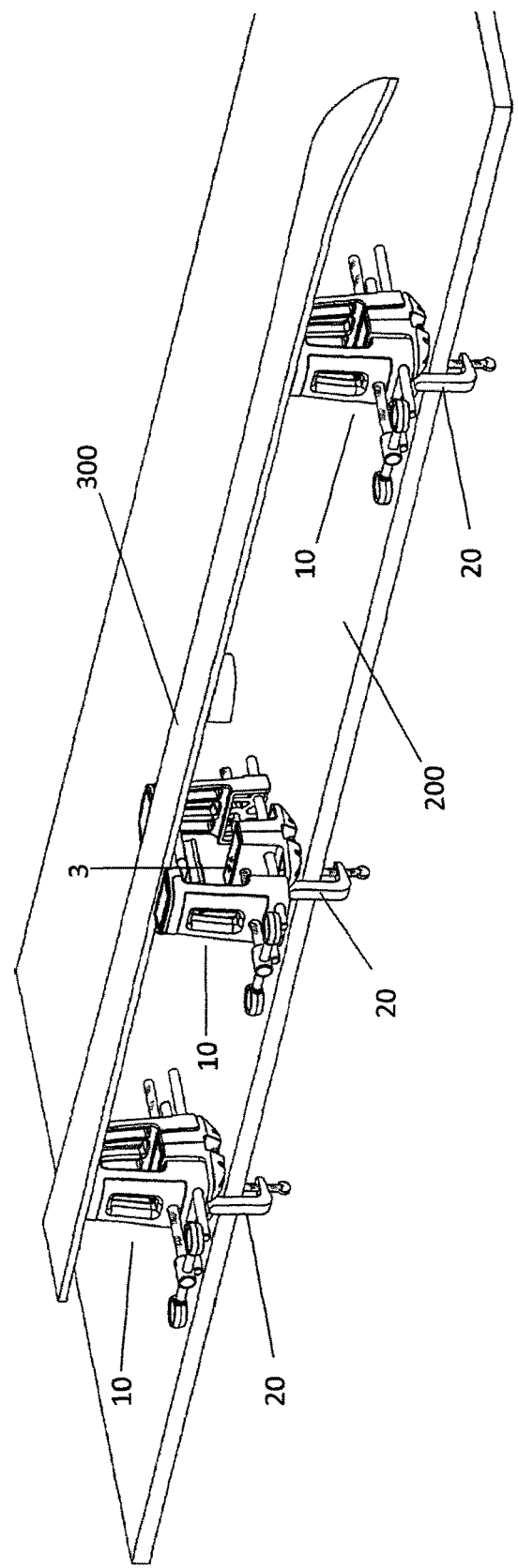
FIG. 6 is a perspective view showing three holders each comprising a vise assembly clamped to a table or work bench in spaced relation with a ski shown positioned upon the holders for ski base preparation/maintenance, in accordance with an embodiment of the disclosure.

With reference to FIG. 3 and FIG. 5, according to one embodiment, the ski and snowboard supports 15 are provided with elongated resilient rubber pads 57 to prevent damage to the ski or snowboard upper surface during use and also to provide for sufficient frictional engagement therewith. According to one embodiment, the ski and snowboard supports 15 are made of a glass-reinforced plastics material moulded as a one-piece formation and include vertical slots 17 (see FIG. 23) preferably of a width slightly larger than the largest ski and snowboard thickness so when either a ski 300 or snowboard 400 is placed upright in slots 17 the ski and snowboard support 15, support head 4 and threaded rod 2 of the holder can be rotated as a unit about the base section 1 of the holder and the holders' vertical axis such that two opposing longitudinal edges of each slot 17 act to clamp the ski or snowboard in a fixed upright position. Locking nut 98 on the lower portion of the threaded rod 2 is tightened and compressed against the top portion 23 (see FIG. 1) of the base section 1 to prevent unwanted longitudinal movement of the ski 300 or snowboard 400 once clamped in slot 17. The ski and snowboard support 15, support head 4 and threaded rod 2 of the holder can also be rotated as a unit about the holders' vertical axis to adjust the height of the support relative to the holder base section 1, or to change the orientation of the support from a position where the support is aligned across the width of a snowboard 400 to a position where the support is aligned with the longitudinal axis of a ski 300.

Figure 25:
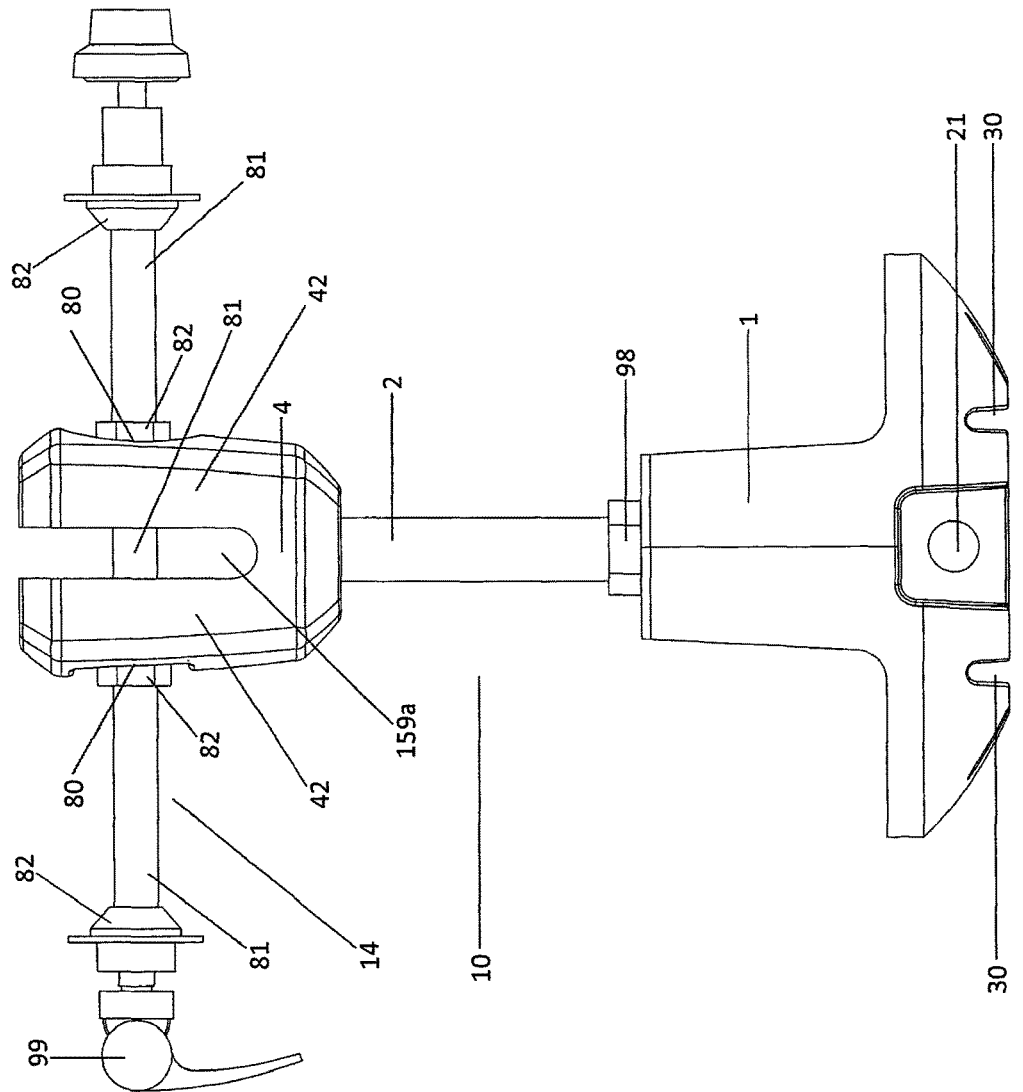
FIG. 25 is a side elevation view of a holder in accordance with the disclosure with a bicycle fork mounting bracket being shown mounted transversely through the support head of the holder, in accordance with an embodiment of the disclosure.

As shown in FIG. 25, according to one embodiment, it will be appreciated that the support head 4 of holder 10 may be arranged to removably hold varying lengths of bicycle fork mounting brackets 14. To achieve this the support head 4 is provided aperture 80 through flanges 42 through which a threaded bicycle axle 81 is inserted and centered so approximately equal lengths of axle 81 are protruding on either of two sides of support head 4. Axle nuts 82 are turned onto the external threads of the axle 81 and tightened against the outside surface of the sides of support head 4 to permit convenient fastening of axle 81 in a transverse orientation through support head 4. Axle 81 can be easily removed from support head 4 by loosening and removing one of the axle nuts 82 on either side of the support head 4. Axle cones 82 are turned onto the threads of axle 81 and positioned in spaced proximity so as to act as a stay against the inside portion of either the front or rear bicycle fork ends when a bicycle 500 is mounted to the holder 10. The fork tightening mechanism may consist of locknuts (not shown) or a quick release mechanism 99 well known in the art.

Figure 11:
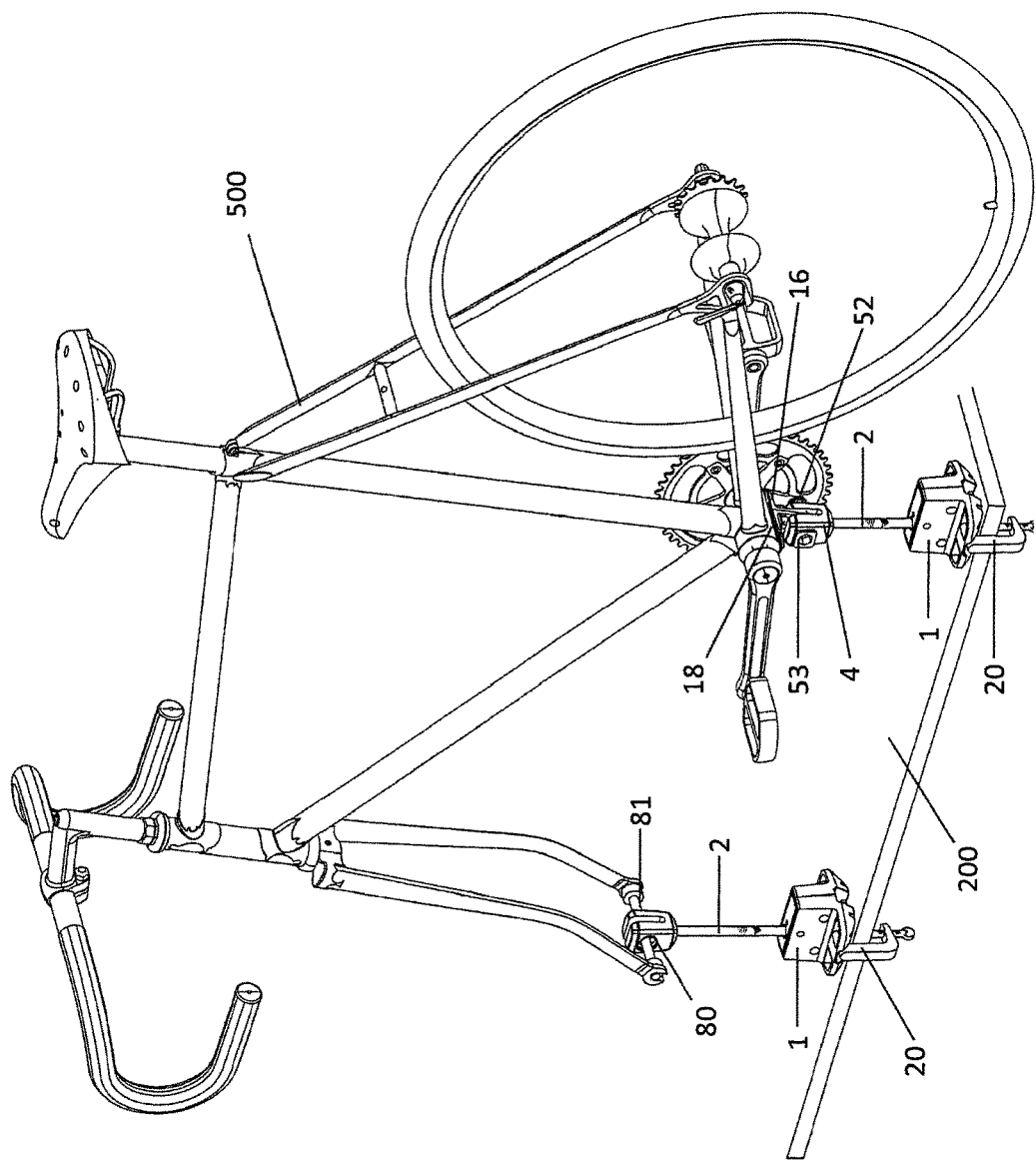
FIG. 11 is a perspective view illustrating a pair of bicycle holders clamped to a table or work bench in spaced relation with a bicycle shown positioned upon the two holders for bicycle maintenance, adjustment or repair, in accordance with an embodiment of the disclosure.
Figure 12:
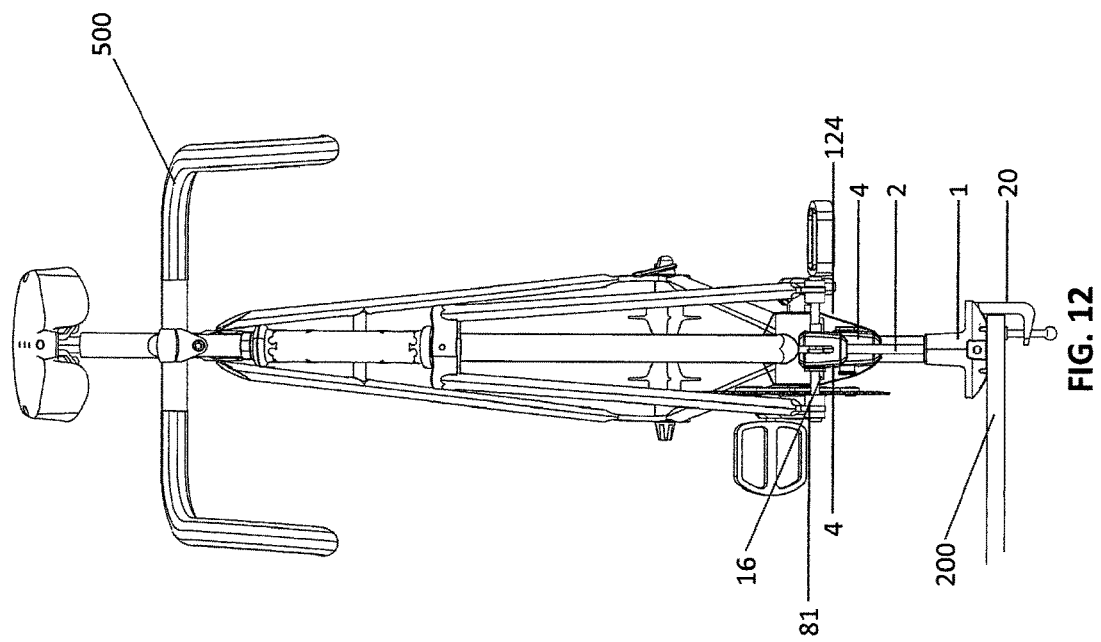
FIG. 12 is a front view illustrating a pair of bicycle holders clamped to a table or work bench in spaced relation with a bicycle shown positioned upon the two holders for bicycle maintenance, adjustment or repair, in accordance with an embodiment of the disclosure.

As shown in FIG. 11, according to one embodiment, the holder 10 including bottom bracket shell support 16 is positioned in close proximity to one corner of the tabletop, support or work station 200 so as to allow either the front or rear bicycle wheel sufficient clearance off the table or stand to spin freely, and threaded rod 2 of the holder 10 is of a sufficient height so as to allow the bicycle crank arms and pedals clearance above the tabletop 200 and base section 1 to rotate without impediment when the bicycle bottom bracket shell is resting on the bottom bracket shell support 16. According to one embodiment, the bottom bracket shell support 16 has a "V" shaped profile 18 allowing a very wide variety of bottom bracket shell diameters and shapes to be cradled between and held within angled flanges 180 and 181 (see FIG. 24) of the bottom bracket shell support 16. According to one embodiment, the bottom bracket shell support 16 has a resilient rubber top surface 19 to prevent damage to the bicycle bottom bracket shell surface and provide for good frictional engagement therewith and is of a width not more than the width of the bicycle bottom bracket itself to allow the bicycle crank arms to clear bottom bracket support 16 without impediment when the bicycle crank arms and pedals are rotated. According to one embodiment, the bottom bracket shell support 16 may be mounted to the support head 4 of the holder 10 for movement between a position where bottom bracket shell support 16 is generally horizontal to one where bottom bracket support 16 is generally vertical, also allowing the support to pivot and be maintained in positions intermediate of horizontal and vertical to accommodate a very wide variety of bicycle frame shapes in the vicinity of the bicycle bottom bracket shell.

With reference to FIG. 34, according to one embodiment, the holder 10 including the bottom bracket shell support 16 includes a retaining strap 124 made of a nylon material (for example) with an eyelet 126 reinforced by a steel grommet 125 of a slightly larger inside diameter than the outside diameter of threaded rod 2 thereby allowing retaining strap 124 to be affixed to holder 10 when threaded rod 2 is placed through eyelet 126 and steel grommet 125. Retaining strap 124 is attached to a rectangular ring 126a by being looped through rectangular ring 126a and sewn to itself by stitching 127. The retaining strap 124 is provided with a length of hook and loop fastener material 128a and 128b stitched to one side of the strap end portion opposite the rectangular ring 126a, providing convenient means to securely fasten retaining strap 124 to itself when looped around and tensioned against the portion of the bicycle frame where the down tube and seat tube meet the bottom bracket shell and looped through rectangular ring 126a.

Figure 8:
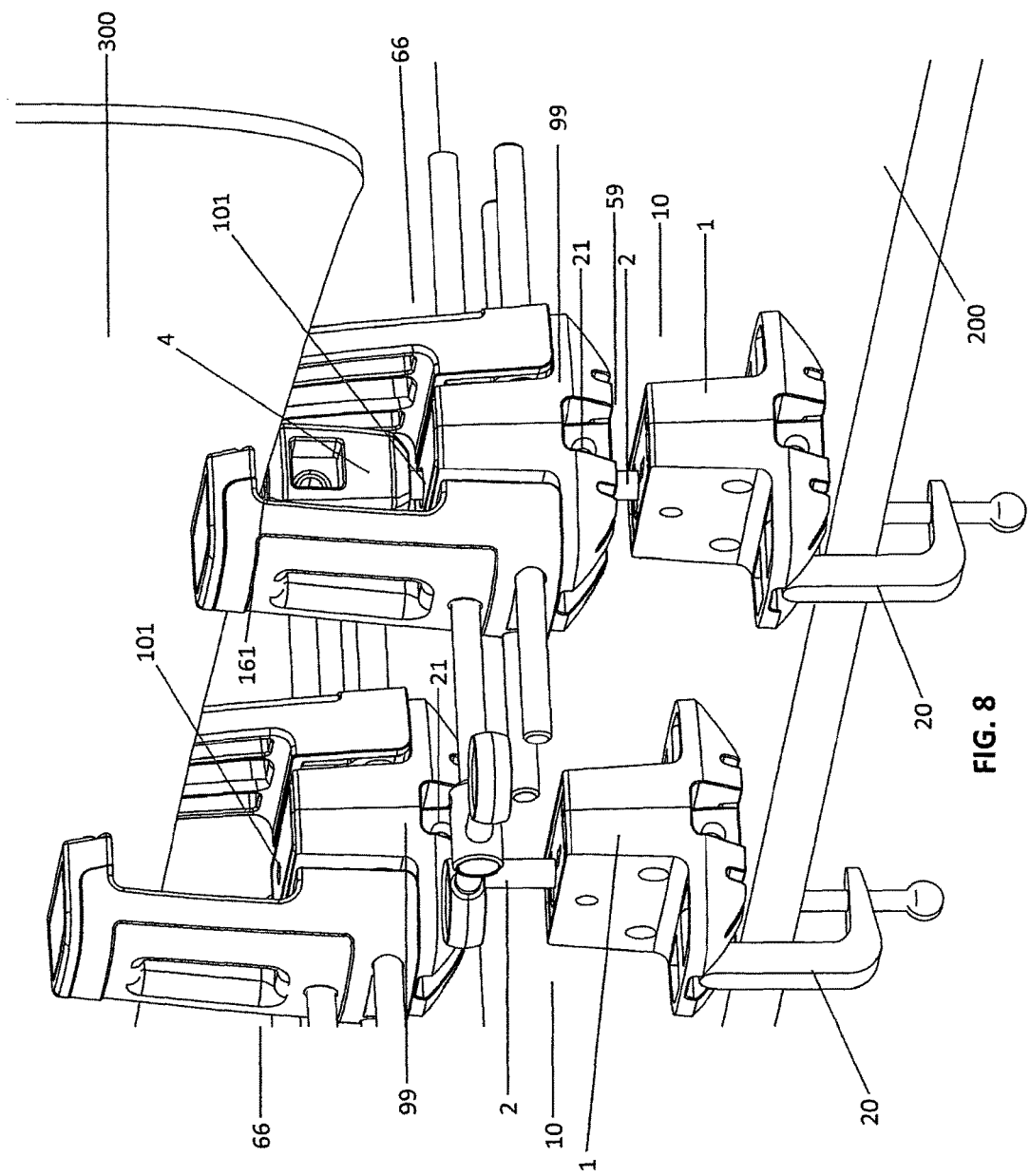
FIG. 8 is a perspective view showing two of the holders clamped to a work bench with the ski having been moved into a vertical orientation and clamped in the vise assemblies of the holders for ski edge maintenance with the ski resting on the top portion of a support head, in accordance with an embodiment of the disclosure.
Figure 9:
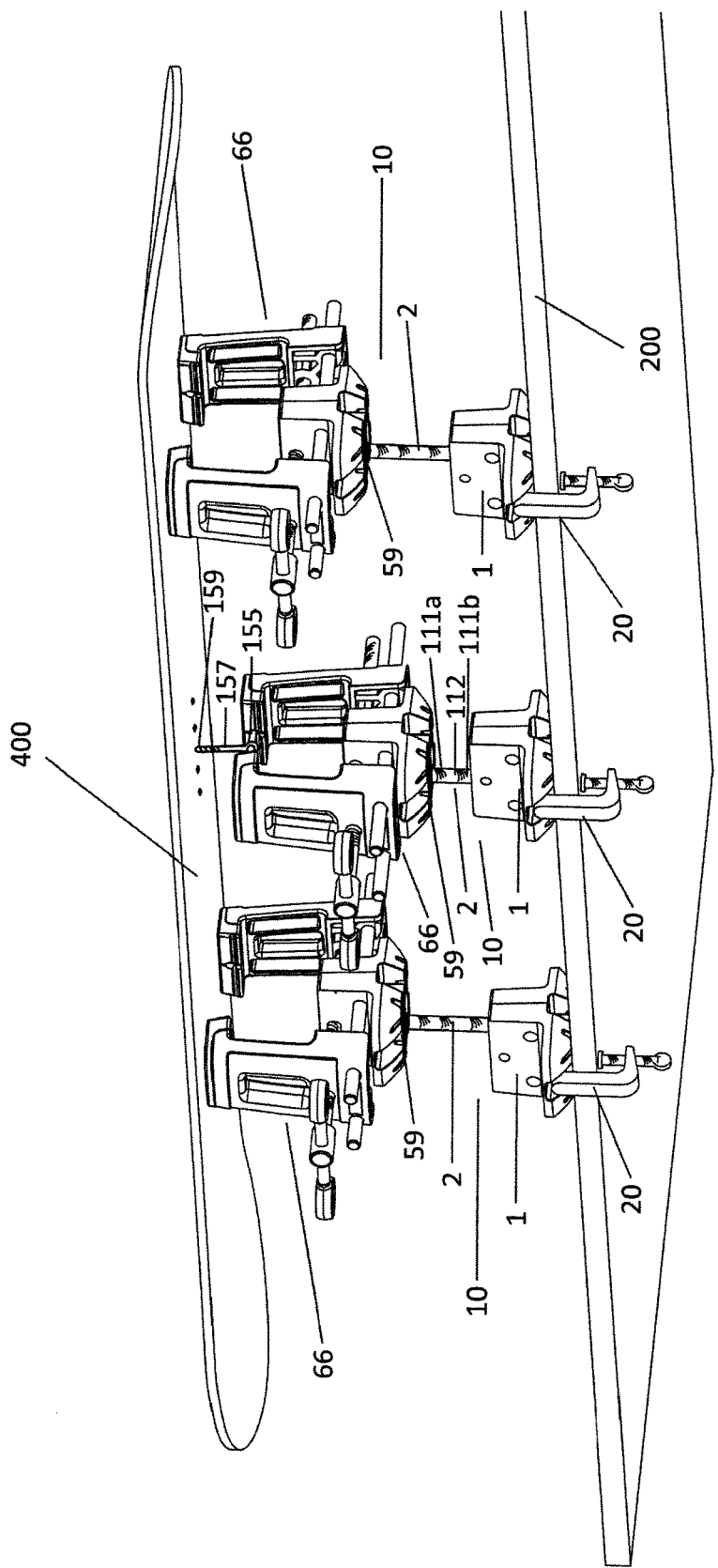
FIG. 9 is a perspective view showing a snowboard positioned upon the holders for snowboard base preparation/maintenance anchored by an eyebolt turned into one of the snowboard threaded inserts, in accordance with an embodiment of the disclosure.
Figure 33:
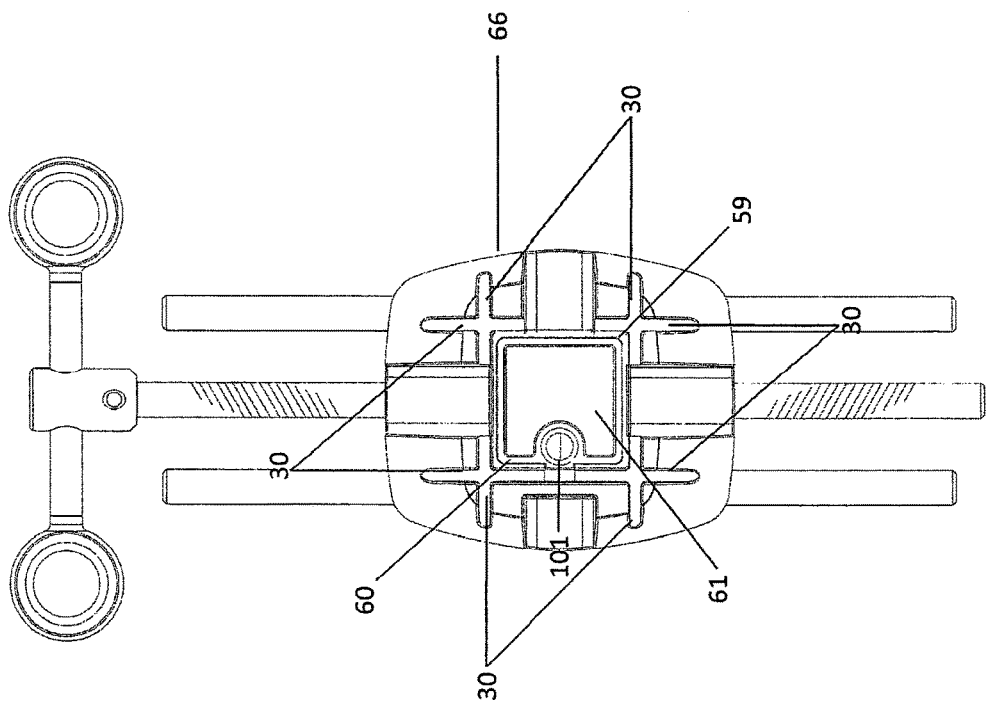
FIG. 33 is a bottom plan view of the vise assembly of the holder in accordance with an embodiment of the disclosure.

FIGS. 8-9, show the vise assembly 66 of the holder 10 in detail, according to one embodiment, a vise base 99 including a perpendicular threaded aperture 101 allows the threaded rod 2 of the holder 10 to be turned into threaded aperture 101 of the vise base 99 to permit mounting of the vise base 99 to the base section 1 of the holder 10. Threaded rod 2 is provided with two reversely disposed sections of threads 111a and 111b with corresponding complimentary threads in threaded apertures 3 and 101 of base section 1 and vise base 99, respectively. A thread-free section 112 on threaded rod 2 between reversely disposed threads 111a and 111b is preferably provided with a knurled surface to assist in obtaining a firm grip when using thumb and fore finger to conveniently turn the threaded rod 2 either clock-wise or counter clock-wise about its vertical axis, thereby allowing height adjustment of the vise base 99 relative to the base section 1 without the need to rotate either vise base 99 or base section 1. Alternatively, the vise base 99 is provided with convenient apertures 22 (see FIG. 31) extending above and parallel to the base bottom 59 to receive the upper legs of the C-clamps 20 to permit convenient clamping of the vise assembly 66 directly to a work station 200 if so desired. As shown in FIG. 33, base bottom 59 is provided with a resilient rubber pad 61 that inserts into the indent 60 in vise base 99 to prevent vise base 99 from marring the work station surface and to provide for good frictional engagement therewith.

Figure 35:
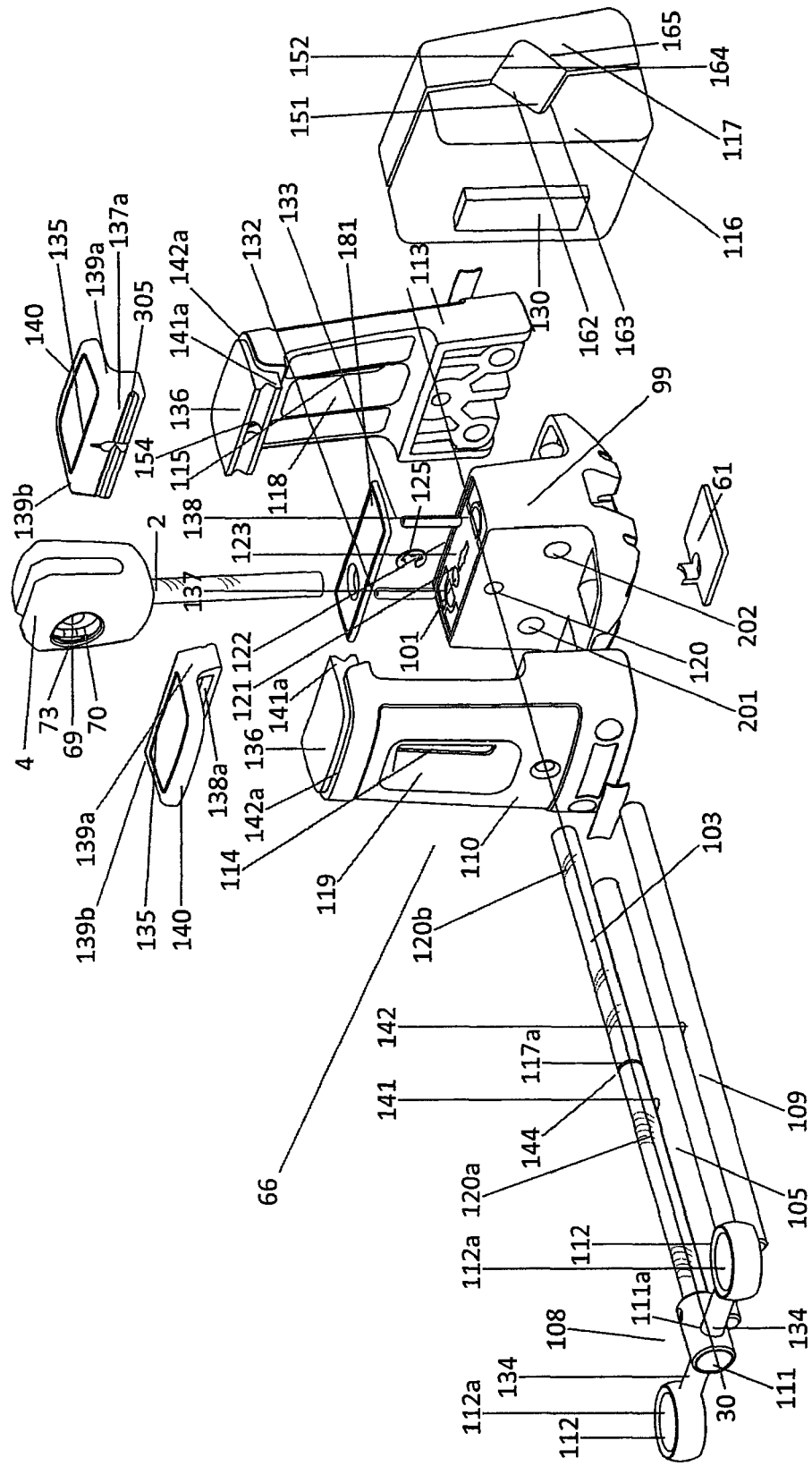
FIG. 35 is an exploded perspective view of the vise assembly and associated components in accordance with an embodiment of the disclosure.

As shown in FIGS. 19-22, according to one embodiment, a vise screw 103 extending horizontally through the vise base 99 with two reversely disposed sections of threads 120a and 120b is provided to allow for movement of oppositely disposed vise jaws 110 and 113 toward and away from each other. Oppositely disposed vise jaws 110 and 113 are provided with vise screw bores 225 and 226, each threaded to match and engage one section of threads 120a or 120b on vise screw 103. One embodiment has jaws 110 and 113 moving concurrently either away from to towards each other by action of vise screw 103. One or more vise screws or other movement mechanisms may be provided to effect such movements. Another embodiment may engage vise screws to either move apart and/or bring together jaws 110 and 113. Other movement and engagement systems may be provided in lieu of, or in addition to vise screws to move one or more of the jaws. For example, unthreaded rods may be used. The movements of the jaws 110 and 113 may or may not be symmetrical in displacement. One or both of jaws 110 and 113 may be fixed for a portion of the movement cycle. As shown in FIG. 35, according to one embodiment, vise screw 103 has in its middle a thread-free section 144 which is rotatably mounted through horizontal aperture 120 in vise base 99. The thread-free section 144 is provided with a recessed groove 117a to accept external retaining ring 125 which acts as a shoulder against walls 121 and 122 (see FIG. 31) of vertical groove 123 extending downward from the top portion of the vise base 99 so the vise screw 103 as a whole is held in horizontal aperture 120 so as to be immovable in the direction of its longitudinal axis 30 but rotatable about the longitudinal axis 30. Guide bars 105 and 109 extend through horizontal guide bores 201 and 202, respectively, through both vise jaw 110 and vise jaw 113 on either side of the vise screw 103 parallel to its longitudinal axis 30 so vise jaw 110 slides parallel to vise jaw 113 when vise screw 103 is turned either clock-wise or counter clock-wise about its longitudinal axis 30. Spring pins 132 and 133 extending through transverse apertures 141 and 142 in guide bars 105 and 109 and into pin receiving indents (not shown) at the bottom of vertical grooves 137 and 138 in vise base 99 are used to fasten guide bars 105 and 109 to vise base 99. Horizontal aperture 120 and horizontal guide bores 201 and 202 in vise base 99 are all of a sufficient length to hold vise screw 103 and guide bars 105 and 109 in a stable horizontal position. Vise screw 103 is turned by means of a handle assembly 108 fastened to one end of the screw including a lever 134 transversely and slidably mounted through aperture 111a in handle end cap 111. Index finger rings 112 mounted on each end of the lever 134 act to prevent the lever from becoming detached from the handle assembly 108 and allow for quick and efficient manual rotation of the handle assembly 108 and vise screw 103 when an index finger is placed through, or partially through ring apertures 112a. The handle end cap 111 is of a larger diameter than vise screw 103 and acts as a stop preventing the vise jaws 110 and 113 from winding off the vise screw 103 when vise jaws 110 and 113 are actuated away from each other. Both vise screw 103 and guide bars 105 and 109 are preferably detachably secured to vise base 99 in order to be readily exchanged with a longer or shorter vise screw 103 and guide bars 105 and 109 depending on the width of ski 300, snowboard 400, bicycle 500 firearm 600 or pipe 700 to be held in the vise assembly 66.

Figure 2:
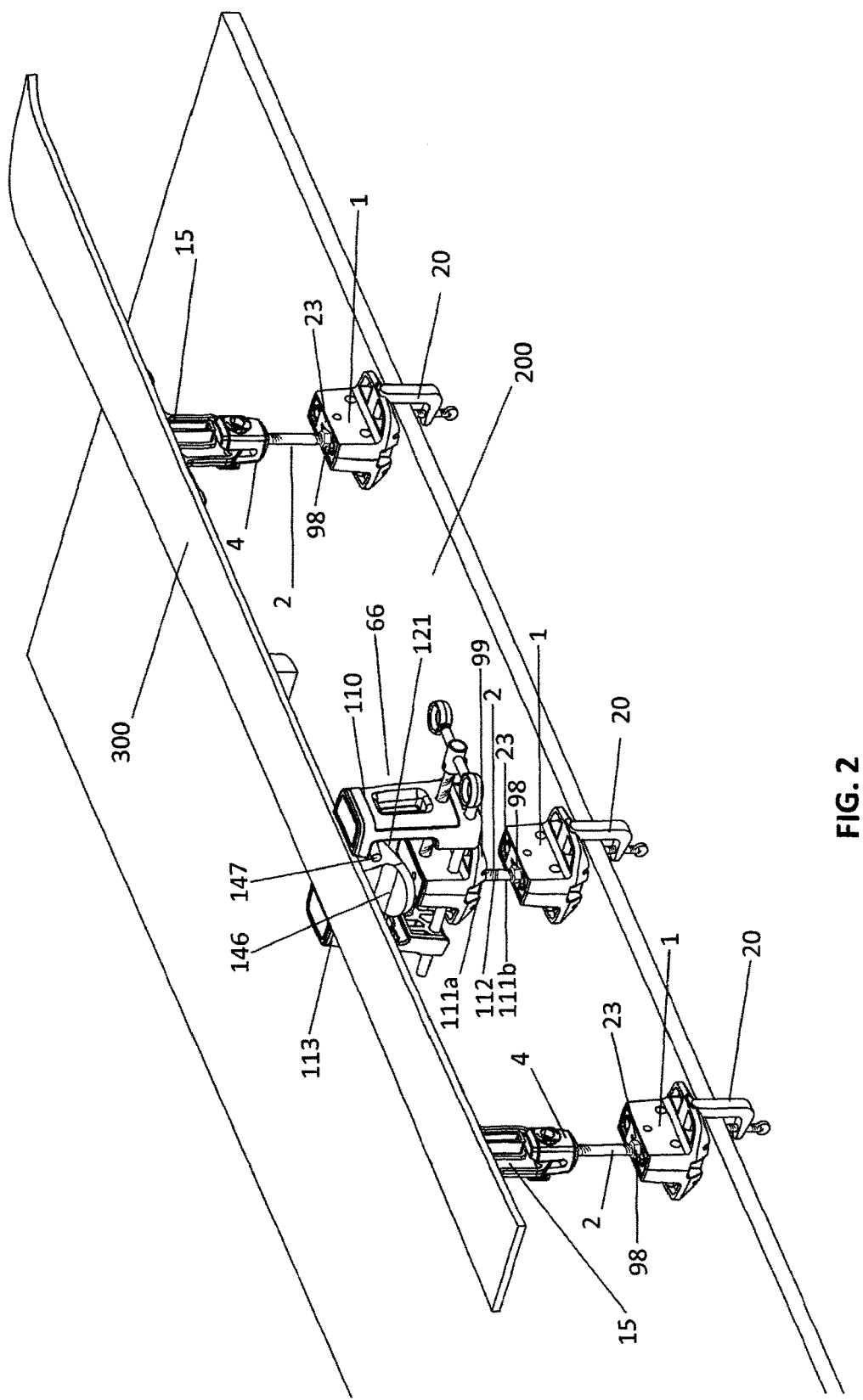
FIG. 2 is a perspective view showing the ski positioned upon the holders for ski base preparation/maintenance, in accordance with an embodiment of the disclosure.
Figure 14:
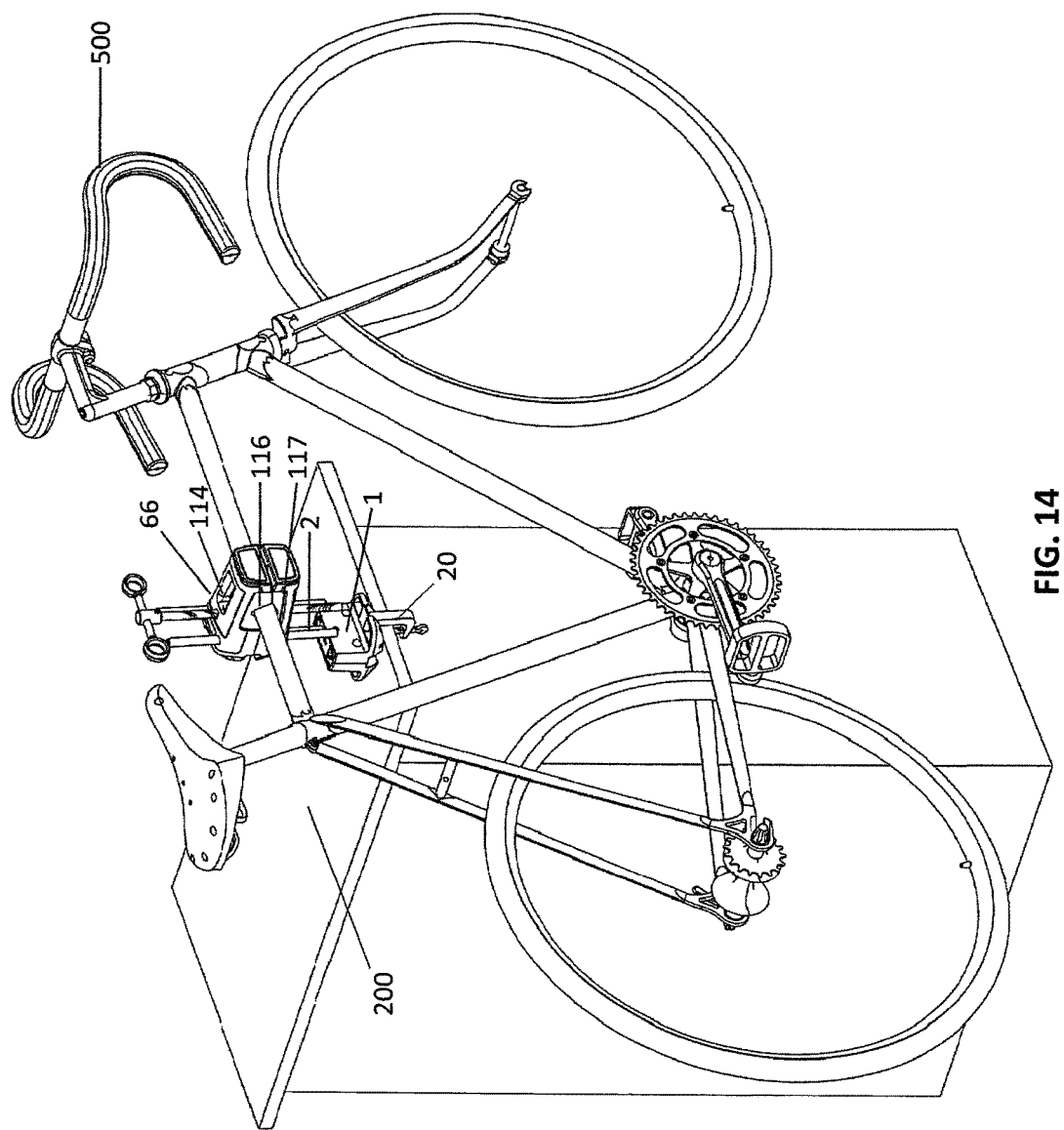
FIG. 14 is a perspective view showing one holder comprising a vise assembly mounted transversely on the vertically orientated threaded rod and base section with the holder clamped to a table or work bench, the vise assembly horizontally clamping the top tube of a bicycle frame and holding a bicycle a sufficient distance off the tabletop to facilitate bicycle maintenance, adjustment or repair, in accordance with an embodiment of the disclosure.
Figure 15:
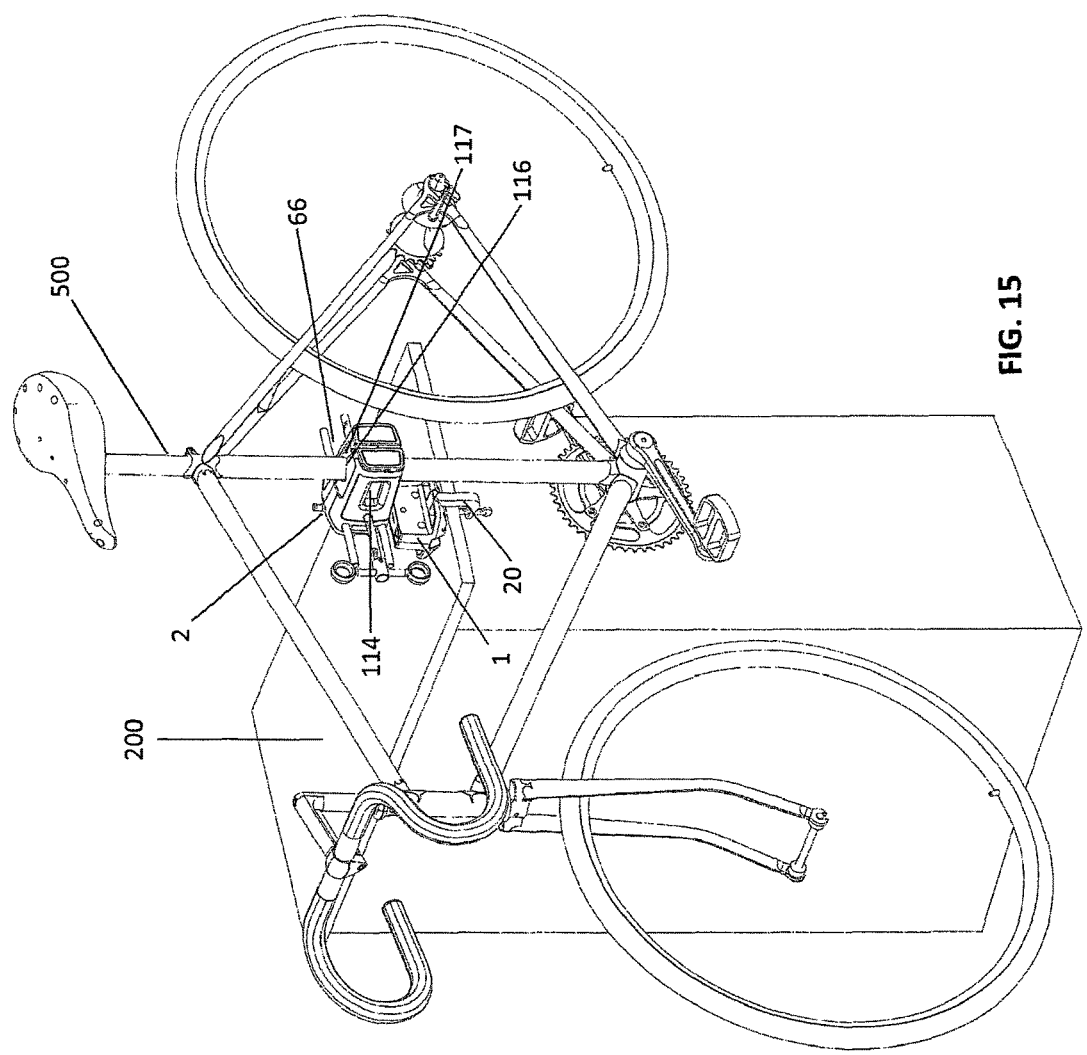
FIG. 15 is a perspective view showing one holder comprising a vise assembly mounted transversely on the vertically orientated threaded rod and base section with the holder clamped to a table or work bench, the vise assembly vertically clamping the seat tube of a bicycle frame and holding a bicycle a sufficient distance off the tabletop to facilitate bicycle maintenance, adjustment or repair, in accordance with an embodiment of the disclosure.

FIGS. 2 and 18 show an open space 121 between the opposing "C" shaped vise jaws 110 and 113 and within the vise assembly 66 allowing a support head 4, clamp knob 32 and/or ski binding 146 and ski brake 147 to be positioned within the vise assembly, the ski brake 147 to be held retracted by and held within vise jaws 110 and 113 when clamping a ski base up in the vise assembly 66, according to one embodiment. Alternatively, as shown in FIGS. 14, 15 and 35, according to one embodiment, bicycle frame pads 116 and 117 are inserted in apertures 114 and 115 in the middle of vise jaws 110 and 113 with frame pad flanges 130 and 131 (not shown) contacting the inside portions 118 and 119 of vise jaws 110 and 113 respectively, such that frame pads 116 and 117 are mechanically held in place within and against vise jaws 110 and 113 so as not to move or become detached from the vise jaw when clamping a bicycle frame. According to one embodiment, the frame pads 116 and 117 have a "V" shaped profile 151 and 152 to facilitate clamping a very wide variety of bicycle frames between the opposing vise jaws 110 and 113 of the vise assembly 66 and frame pads 116 and 117 are, according to one embodiment, made of a resilient material such as rubber so as not to dent, mar or otherwise damage the bicycle frame being clamped. Other shapes may be provided in the pads which would facilitate clamping.

Figure 20:
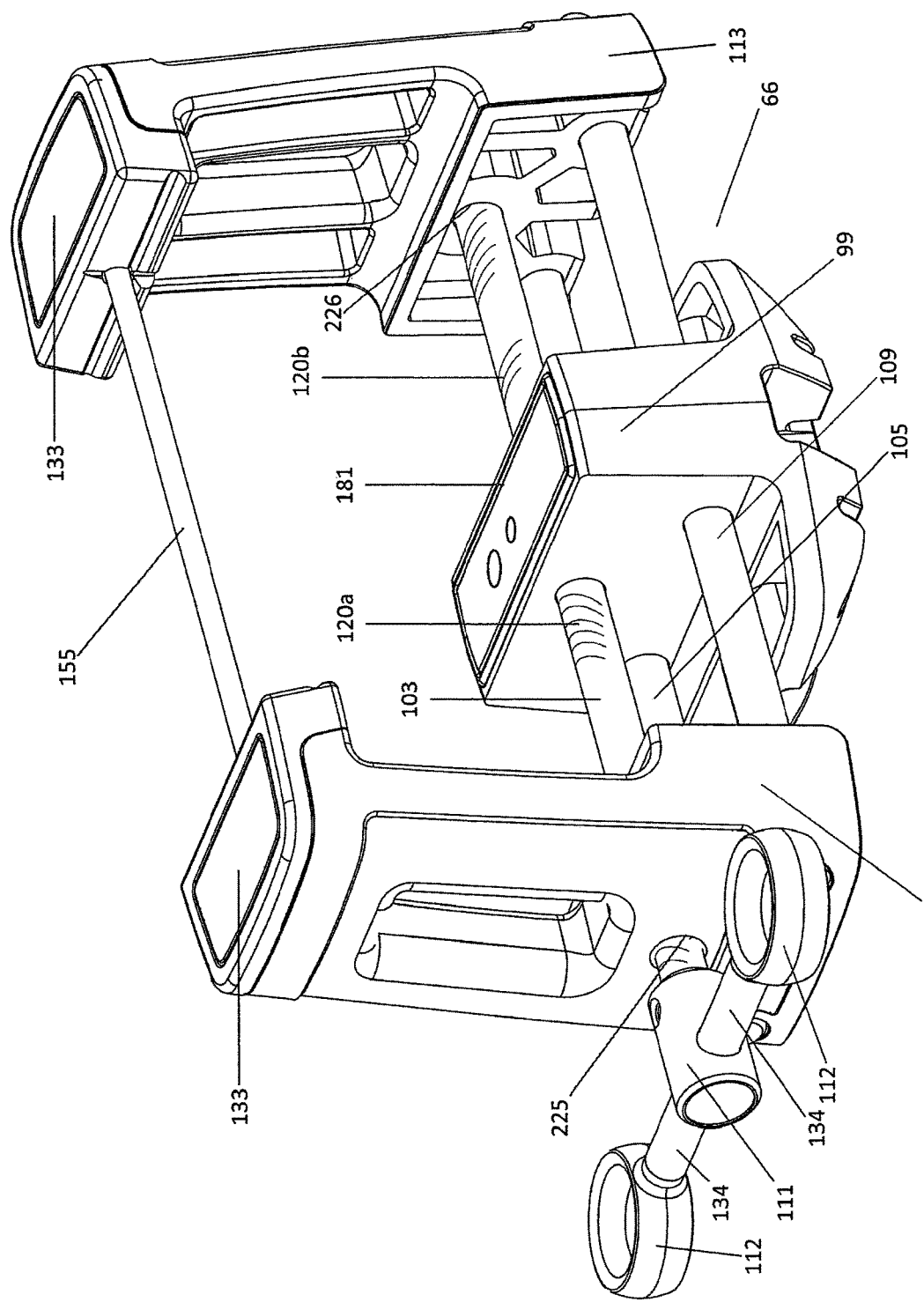
FIG. 20 is a perspective view of the vise assembly with a pin shown placed in a perpendicular orientation and clamped in the stepped indents of the oppositely disposed vise jaws, in accordance with an embodiment of the disclosure.
Figure 21:
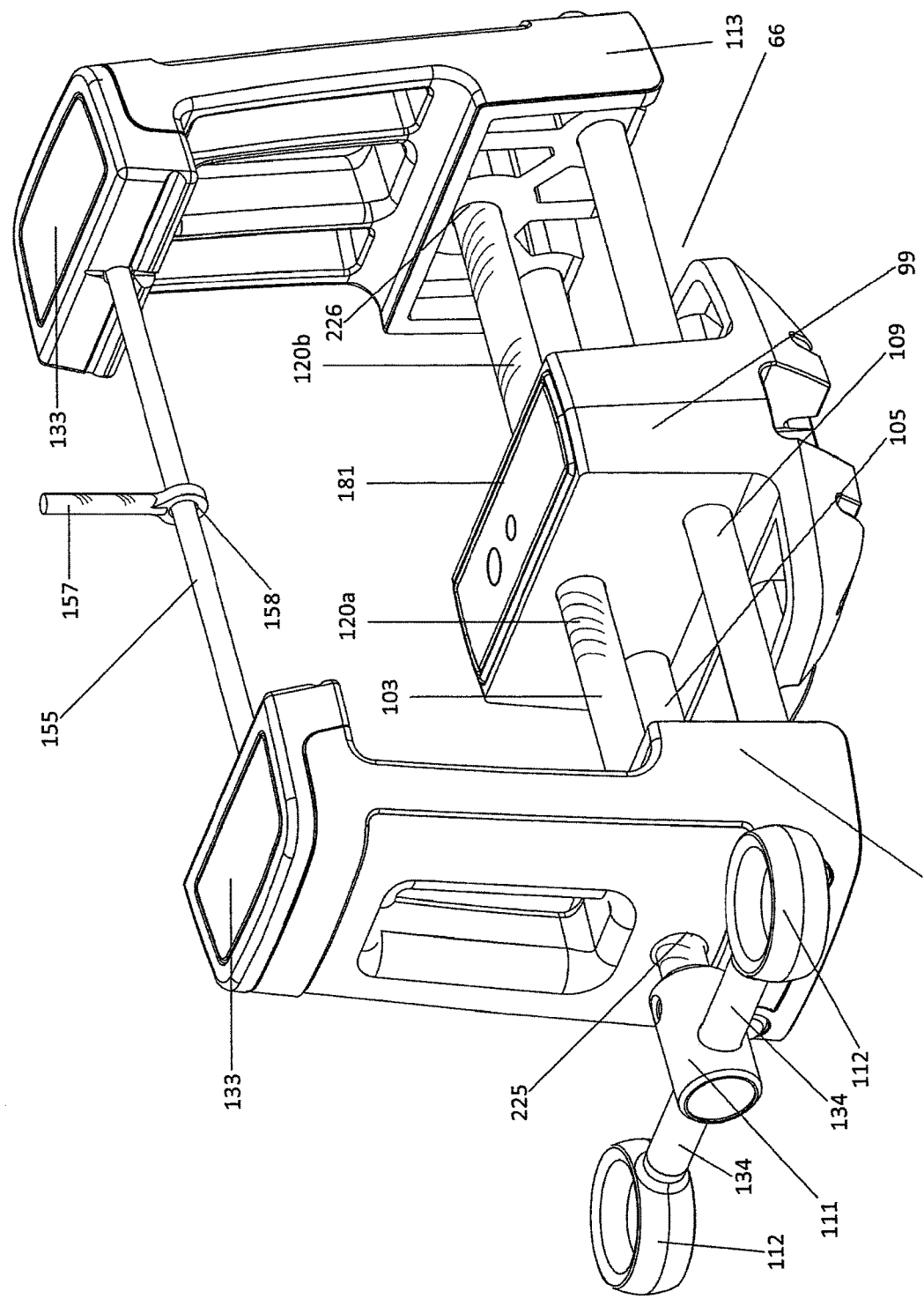
FIG. 21 is a perspective view of the vise assembly with a pin shown anchoring an eyebolt, the pin placed in a perpendicular orientation and clamped in the stepped indents of the vise jaws, in accordance with an embodiment of the disclosure.
Figure 22:
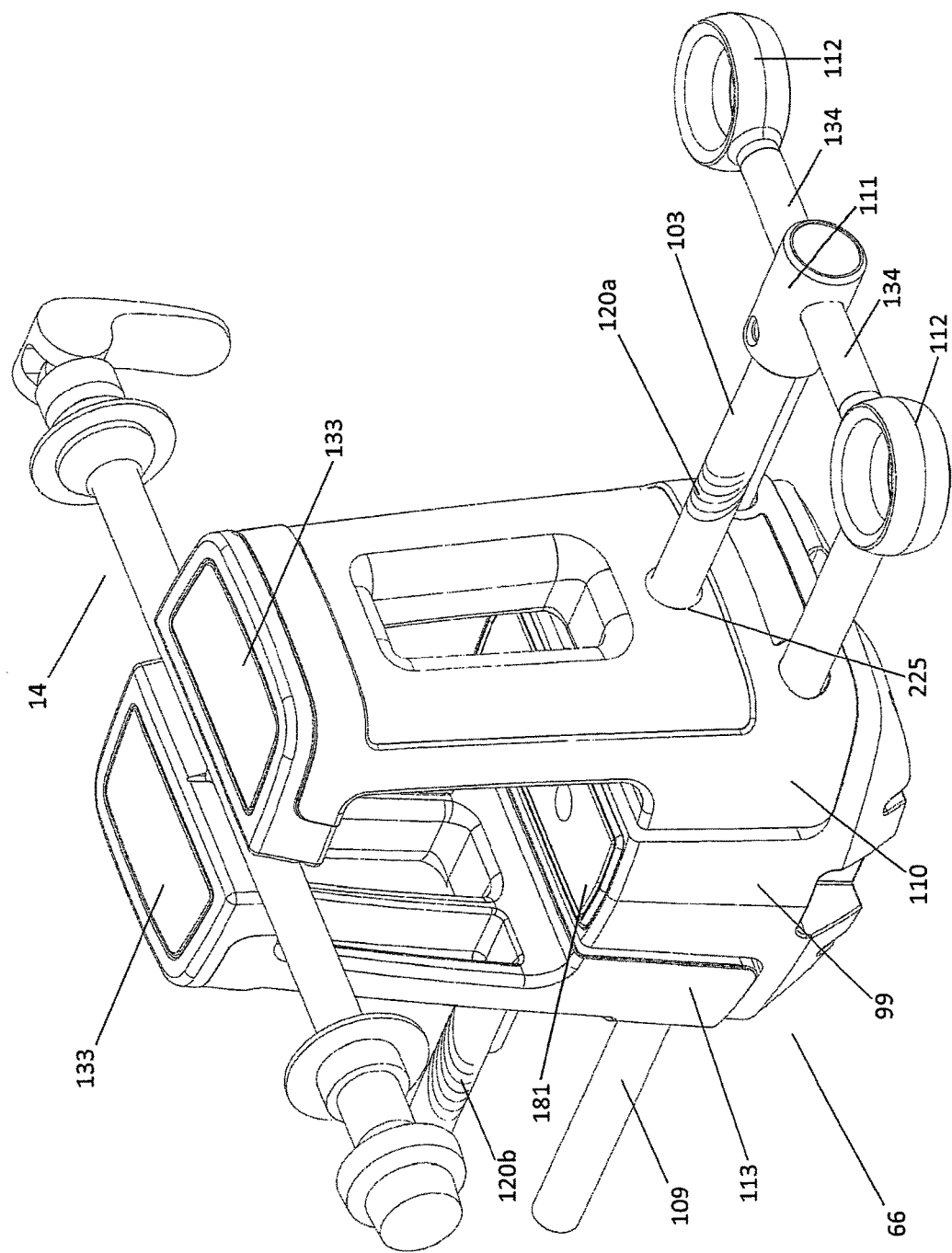
FIG. 22 is a perspective view showing a bicycle fork mounting bracket clamped horizontally between, and parallel with the oppositely disposed vise jaws of the vise assembly, in accordance with an embodiment of the disclosure.
Figure 31:
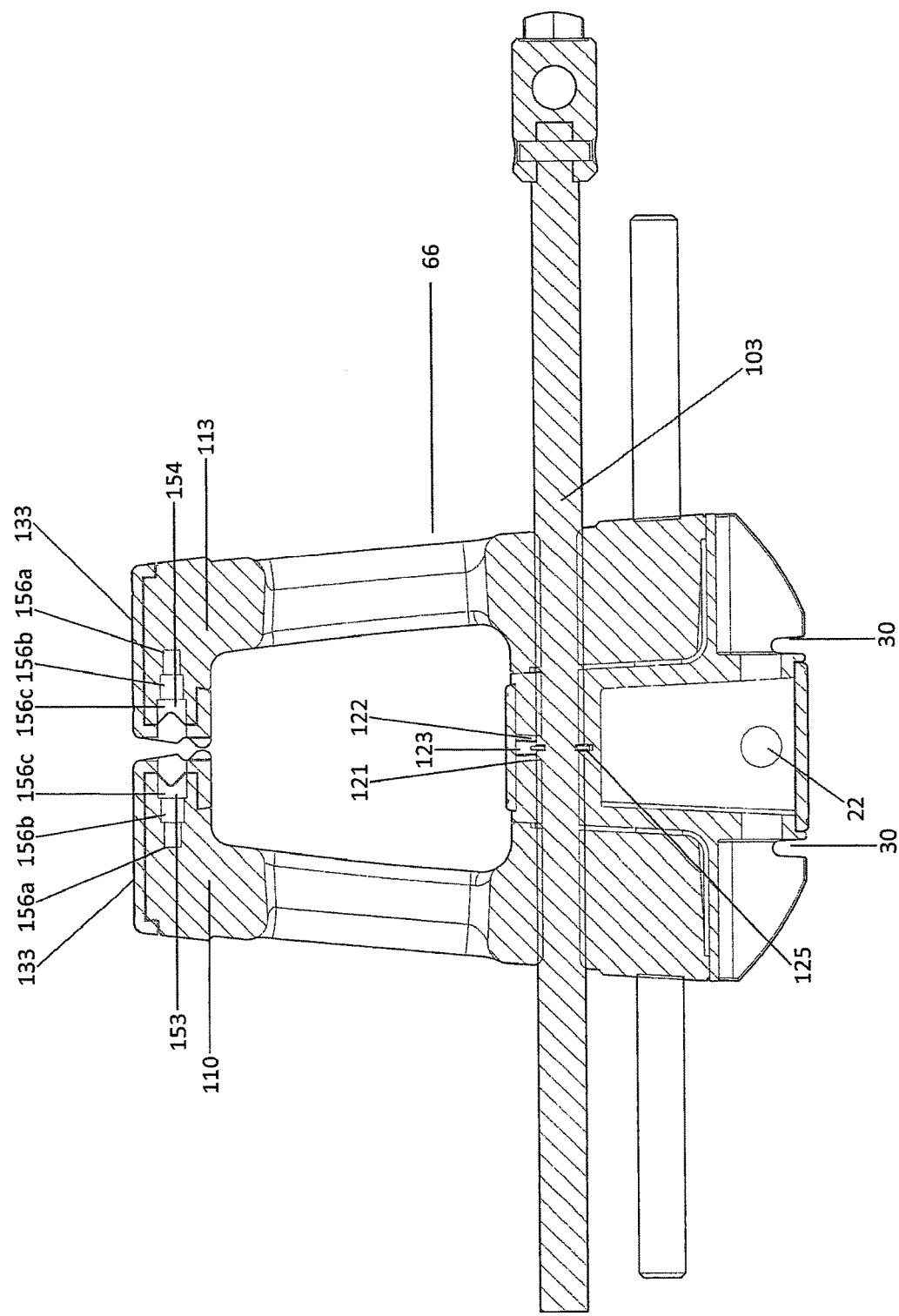
FIG. 31 is a section view of the vise assembly on the line 4-4 of FIG. 30, in accordance with an embodiment of the disclosure.
Figure 32:
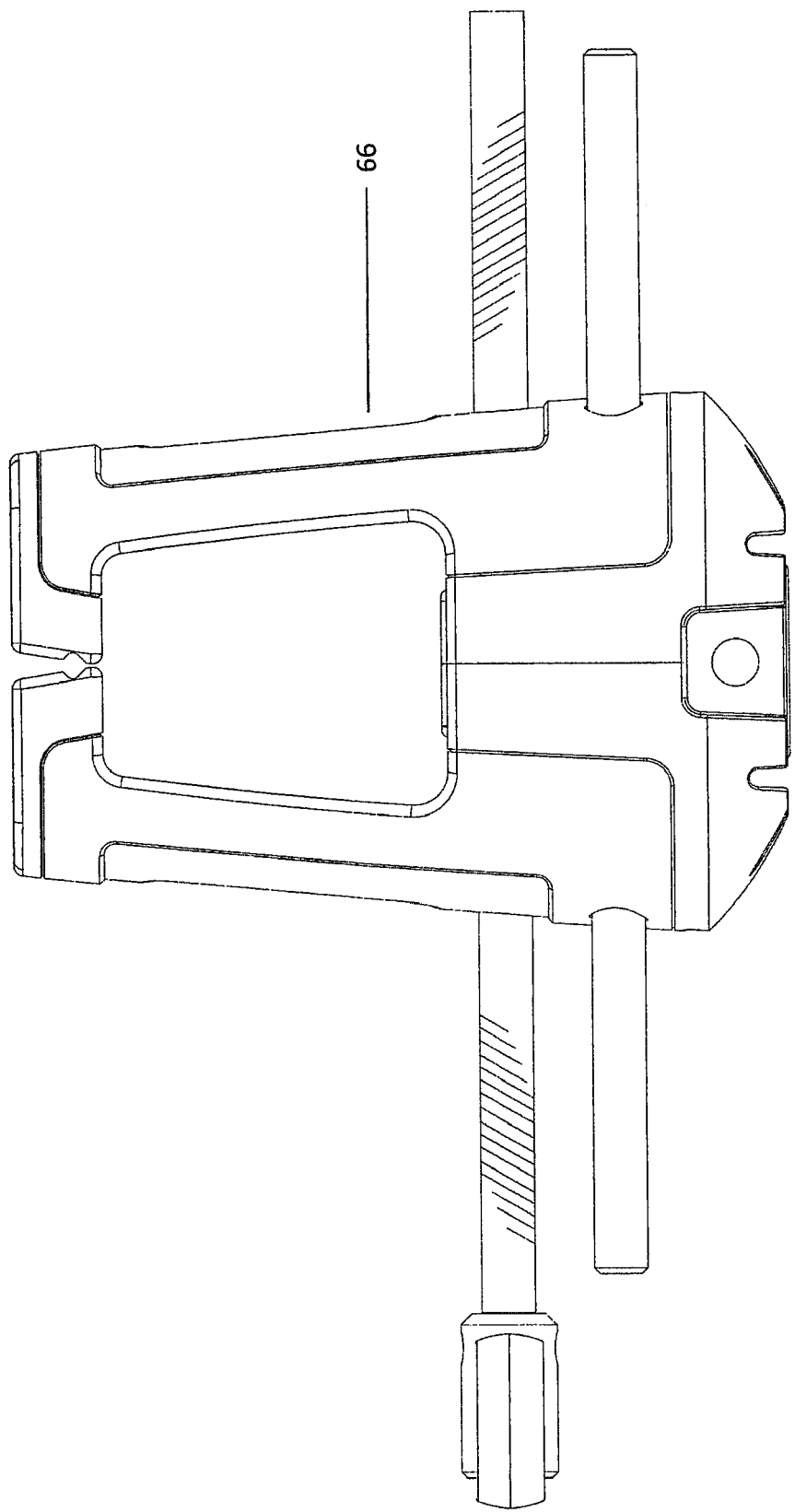
FIG. 32 is a side elevation view of the vise assembly of the holder in accordance with an embodiment of the disclosure.

As shown in FIGS. 20, 21 and 31, according to one embodiment, each of the vise jaws 110 and 113 includes recessed stepped indents 153 and 154 to receive and hold pins 155 of varying diameters and lengths when oppositely disposed vise jaws 110 and 113 are closed upon both ends of pin 155 extending between and perpendicular to the vise jaws 110 and 113. Pin 155 is closed upon and fixed between vise jaws 110 and 113 to horizontally position and mimic the pin employed by certain types of cross country, touring and backcountry ski boots. Certain skis with bindings typically of the Nordic variety can then be attached to the vise assembly 66 through pin 155 by closing the ski binding upon pin 155 in the same manner the binding attaches to the ski boot. According to one embodiment, at least three diameters of pins may be held in progressively smaller diameter stepped indents 156a, 156b and 156c in each vise jaw 110 and 113 onto which both NNN and SNS cross country, touring and backcountry touring ski bindings may be fastened. As shown in FIGS. 9 and 21, according to one embodiment, pin 155 may also be used to provide anchor for an eyebolt 157 when pin 155 is inserted through eyebolt aperture 158, closed upon and fixed between vise jaws 110 and 113 in order to fasten a snowboard 400 to the vise assembly 66 when eyebolt 157 is turned into one of the snowboard threaded inserts 159. The threaded rod 2 of the holder 10 is provided with two reversely disposed sections of threads 111a and 111b with corresponding complimentary threads in threaded apertures 3 and 101 of base section 1 and vise base 99 respectively with a thread-free section 112 on threaded rod 2 between reversely disposed threads 111a and 111b to permit convenient turning of the threaded rod 2 either clock-wise or counter clock-wise about its vertical axis, thereby allowing the height of the holder 10 to be readily adjusted relative to the snowboard 400 without the need to rotate either vise base 99 or base section 1.

As shown in FIGS. 20, 21, 22 and 31, according to one embodiment, a flat surface 133 is provided on the top of each vise jaw 110 and 113 allowing the vise assembly 66 to act as a rest in addition to having clamping ability. The vise jaws 110 and 113 are actuated towards each other to clamp either a ski 300 or snowboard 400 in a vertical orientation, or actuated a sufficient distance away from each other to provide stable support for a ski or snowboard resting horizontally on the flat top surface 133 of each vise jaw. The vise assembly 66 is able to be rotated such that the vise jaws 110 and 113 can be positioned in line with the longitudinal axis of the ski 300 or snowboard 400 so as not to interfere with base rifling, structuring and/or imprinting tools with vertically disposed flanges of a thickness greater than the thickness of a ski or snowboard when drawn down the ski or snowboard base as required when the ski or snowboard is resting base up. As shown in FIG. 35, according to one embodiment, the vise jaws 110 and 113 may be provided with resilient jaw pads 135, each pad covering the entire top portion 136 of each vise jaw and comprising a front flange 137a, bottom flange 138a, side flanges 139a, 139b and rear flange 140 to cooperate with jaw block 141a and stepped indent 142a of vise jaws 110 and 113 such that each pad 135 is mechanically held in place against vise jaws 110 and 113 so as not to move or become detached from the vise jaw when clamping. According to one embodiment, the jaw pads are made of a resilient material such as rubber so as not to dent, mar or otherwise damage the ski 300, snowboard 400, bicycle 500, gun 600 or pipe 700 being clamped.

Figure 7:
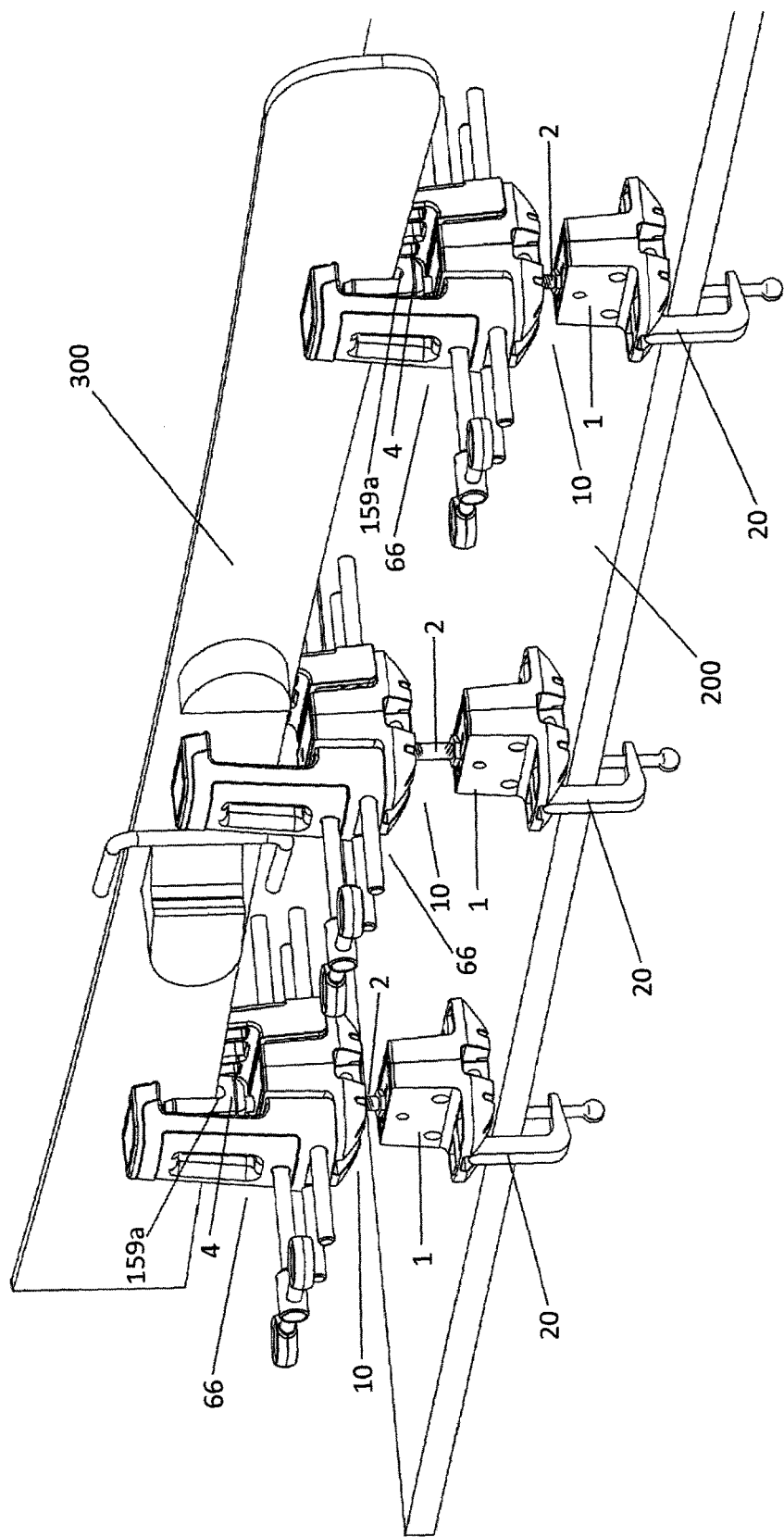
FIG. 7 is a perspective view showing the same holders clamped to a work bench but with the ski having been moved into a vertical orientation and clamped in the vise assemblies of the holders for ski edge maintenance with the ski resting between the two flanges of the support heads, in accordance with an embodiment of the disclosure.
Figure 10:
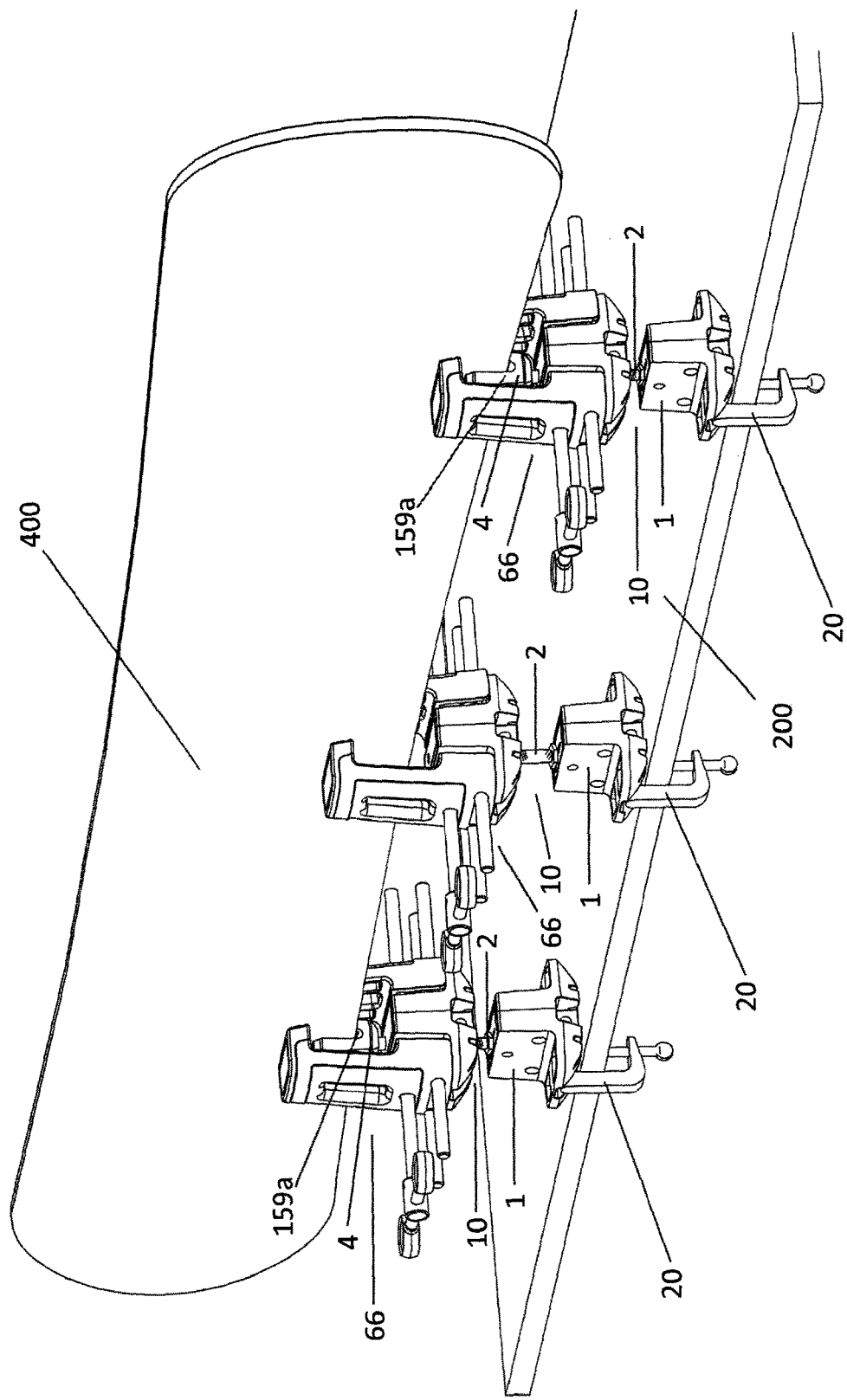
FIG. 10 is a perspective view showing the same holders clamped to a work bench but with the snowboard having been moved into a vertical orientation and clamped in the vise assemblies of the holders for snowboard edge maintenance with the snowboard resting between the two flanges of the support heads, in accordance with an embodiment of the disclosure.

With reference to FIGS. 6, 7, 9 and 10, there is shown in accordance with embodiments of the disclosure, three holders 10 each comprising a vise assembly 66 clamped to a tabletop, support or work station 200 such that a first (right) holder 10 is placed under or in close proximity to the shovel portion of a ski 300 or snowboard 400, a second (middle) holder 10 is positioned under the binding area and a third (left) holder 10 positioned under or in close proximity to the tail portion of a ski 300 or snowboard 400. As shown in FIGS. 7 and 10, according to one embodiment, the first (right) and third (left) holders 10 are positioned under or in close proximity to both shovel and tail portions of the ski or snowboard and are each equipped with support heads 4 mounted upon the threaded rod 2 portions of each holder. Vertical slot 159a (see FIG. 25) in each support head 4 serves to stabilize a ski 300 or snowboard 400 in a generally upright position when the support head 4 is rotated about its vertical axis such that the vertical slot 159 is aligned parallel with vise jaws 110 and 113 and the ski 300 or snowboard 400 is dropped down into vertical slot 159a and clamped between vise jaws 110 and 113 to permit convenient side edge tuning. The support head 4 of each holder 10 also acts as a rest for a ski 300 placed upright on the top surface 161 (see FIG. 8) of support head 4 then clamped between the vise jaws 110 and 113 when support head 4 is rotated about its vertical axis such that the vertical slot 159a is perpendicular to vise jaws 110 and 113, thereby allowing the vise jaws to clamp the ski 300 relatively close to its bottom edge allowing work to be done on the top edge of the ski 300 without obstruction from the vise jaws 110 and 113. A ski 300 is held either base up for base tuning or base down to facilitate binding mounting by clamping the sides of the ski 300 in the binding area using the second holder 10 and resting the shovel and tail portions of the ski 300 on the top flat surface 133 (see FIG. 31) of the vise jaws 110 and 113 of the first and third holders 10. When holding skis 300 having an alpine binding the second holder 10 is positioned directly under the binding ski brake 147.

Figure 13:
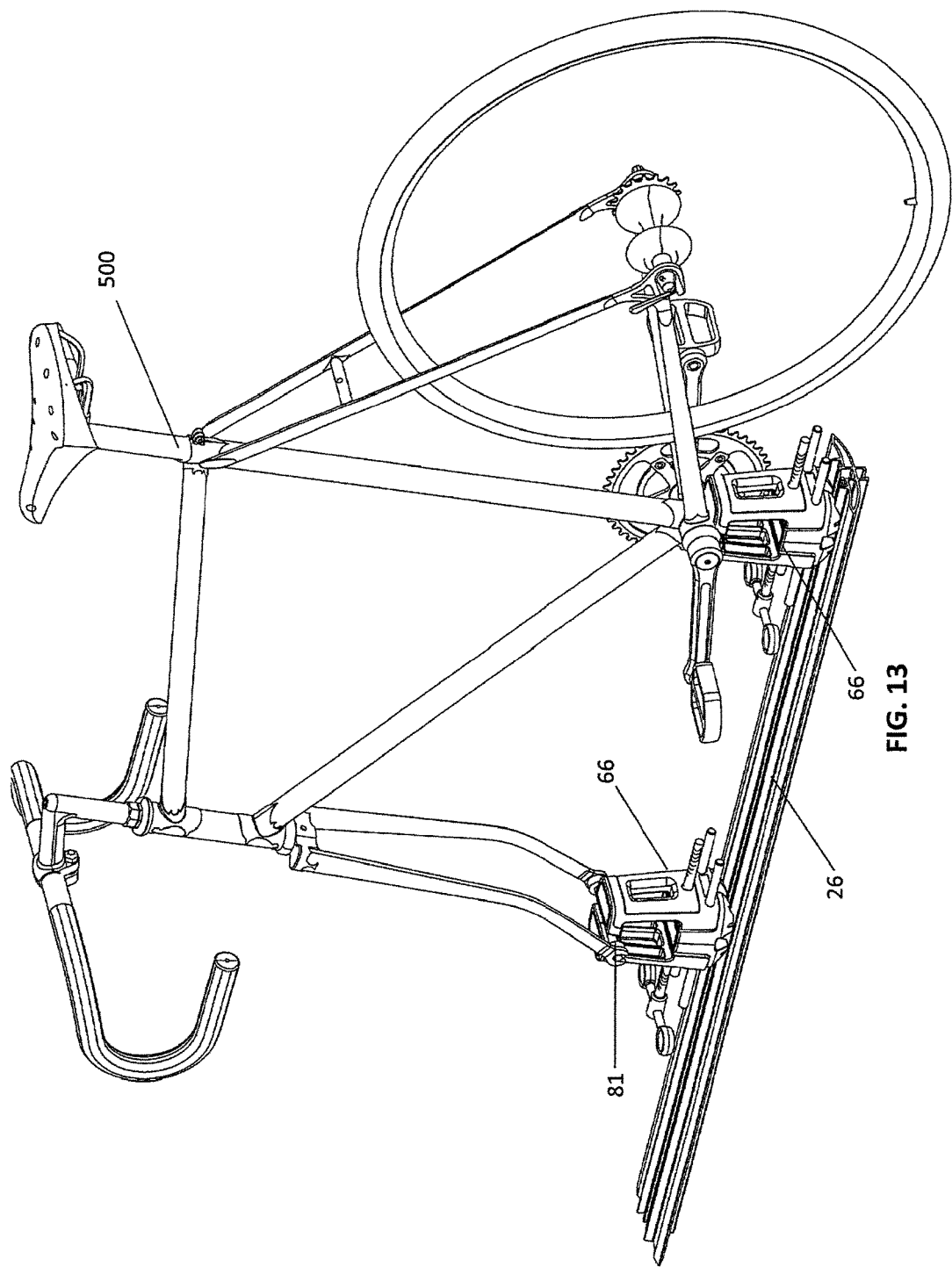
FIG. 13 is a perspective view showing two holders each comprising a vise assembly fastened to a support rail in spaced relation with a bicycle shown positioned on the holders for bicycle maintenance, adjustment or repair, in accordance with an embodiment of the disclosure.

In one embodiment of the disclosure shown in FIG. 13, a first and second holder 10 each comprising a vise assembly 66 are mounted on an elongated support rail 26 with each holder positioned in spaced relation along the support rail 26 such that the first (right) holder 10 is placed under or in close proximity to a bicycle frame bottom bracket shell and the second (left) holder 10 is positioned under either the front bicycle dropout or rear bicycle dropout. The vise assembly 66 of each holder 10 is orientated such that the vise jaws 110 and 113 are transversely positioned relative to the length of the support rail 26 on which the supports are fastened. The vise jaws 110 and 113 of the first (right) holder 10 can be adjusted towards or away from each other to allow the bicycle bottom bracket shell to be seated against, and rest upon, the front flange 137a (see FIG. 35) of each jaw pad 135 with the longitudinal axis of the bottom bracket parallel to both vise jaws 110 and 113. The first (right) holder 10, according to one embodiment, includes the retaining strap 124 described in detail above (see FIG. 34) to provide convenient means to secure the bicycle frame against vise jaws 110 and 113. According to one embodiment, a horizontal "V" shaped groove 305 (see FIG. 35) is provided in the top clamping surface 137a of each vise jaw 110 and 113 allowing for convenient horizontal clamping of a wide variety of bicycle fork mounting brackets 14 (see FIG. 25) with circular cross sections in the vise jaws of the second (left) holder 10, thereby allowing the front or rear bicycle dropout to be securely fastened to second (left) holder 10.

With reference to FIGS. 14 and 15, there is shown in accordance with one embodiment of the disclosure, opposing vise jaws 110 and 113 of vise assembly 66 including apertures 114 and 115 (see FIG. 35) where resilient rubber frame pads 116 and 117 are inserted to facilitate clamping a very wide variety of bicycle frames between the opposing vise jaws 110 and 113 of the vise assembly 66. Each frame pad 116 and 117, according to one embodiment, has a "V" shaped profile 151 and 152 (see FIG. 35) allowing a very wide variety of bicycle frame tube diameters and shapes to be cradled between and held within angled flanges 162, 163 and 164, 165 of the frame pads 116 and 117, respectively. The frame pads 116 and 117 are, according to one embodiment, made of a resilient rubber material to prevent damage to the bicycle frame and provide for good frictional engagement therewith. Pads may or may not be provided. As shown in FIG. 26, according to one embodiment, vise assembly 66 is mounted transversely on the vertically orientated threaded rod 2 of the holder 10 with threaded rod 2 turned into a corresponding threaded aperture 166 (similar to 21, 167) in vise base 99. In this manner the vise assembly 66 is positioned in a generally horizontal orientation with the longitudinal axis of opposing vise jaws 110 and 113 parallel with the tabletop 200 allowing vise jaws 110 and 113 of the vise assembly 66 to both clamp the top tube of the bicycle frame and act to suspend the bicycle 500 a sufficient distance off the tabletop 200 and above the ground to facilitate bicycle maintenance, adjustment or repair. Alternatively, according to one embodiment, the vise assembly 66 can be mounted transversely on the vertically orientated threaded rod 2 of the holder through a second threaded aperture 167 in the vise base 99 positioning the vise assembly 66 in a generally horizontal orientation, but with the vise jaws 110 and 113 perpendicular to the tabletop 200. In this orientation, the opposing vise jaws 110 and 113 are able to clamp the vertically orientated seat tube of the bicycle frame, thereby holding the bicycle 500 sufficiently off the table 200 and above the ground to facilitate bicycle maintenance, adjustment and repair operations thereon.

Figure 16:
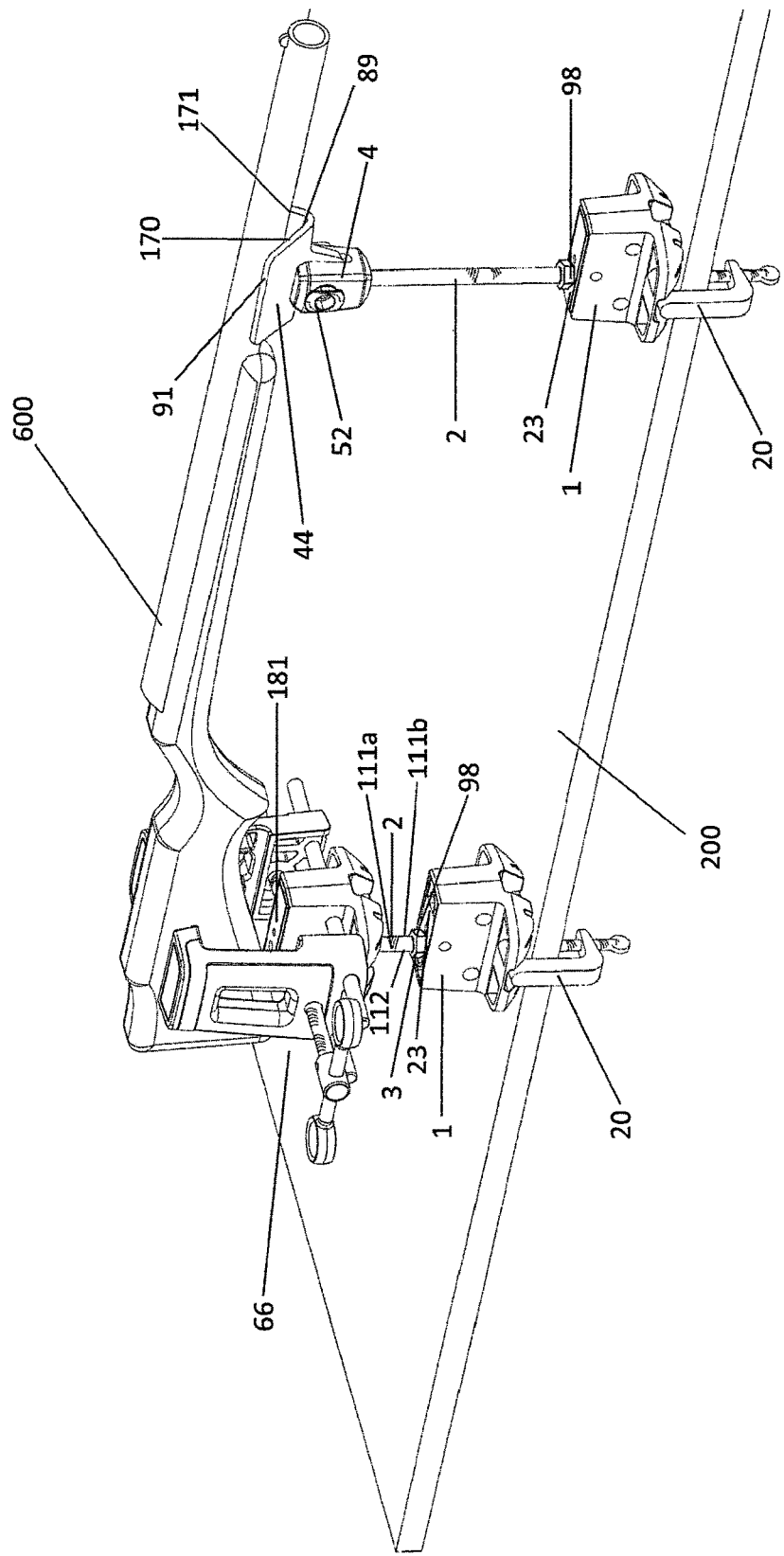
FIG. 16 is a perspective view illustrating a pair of firearm holders clamped to a table or work bench in spaced relation with a gun shown positioned on the two holders for gun inspection, cleaning, repair and sighting, in accordance with an embodiment of the disclosure.
Figure 17:
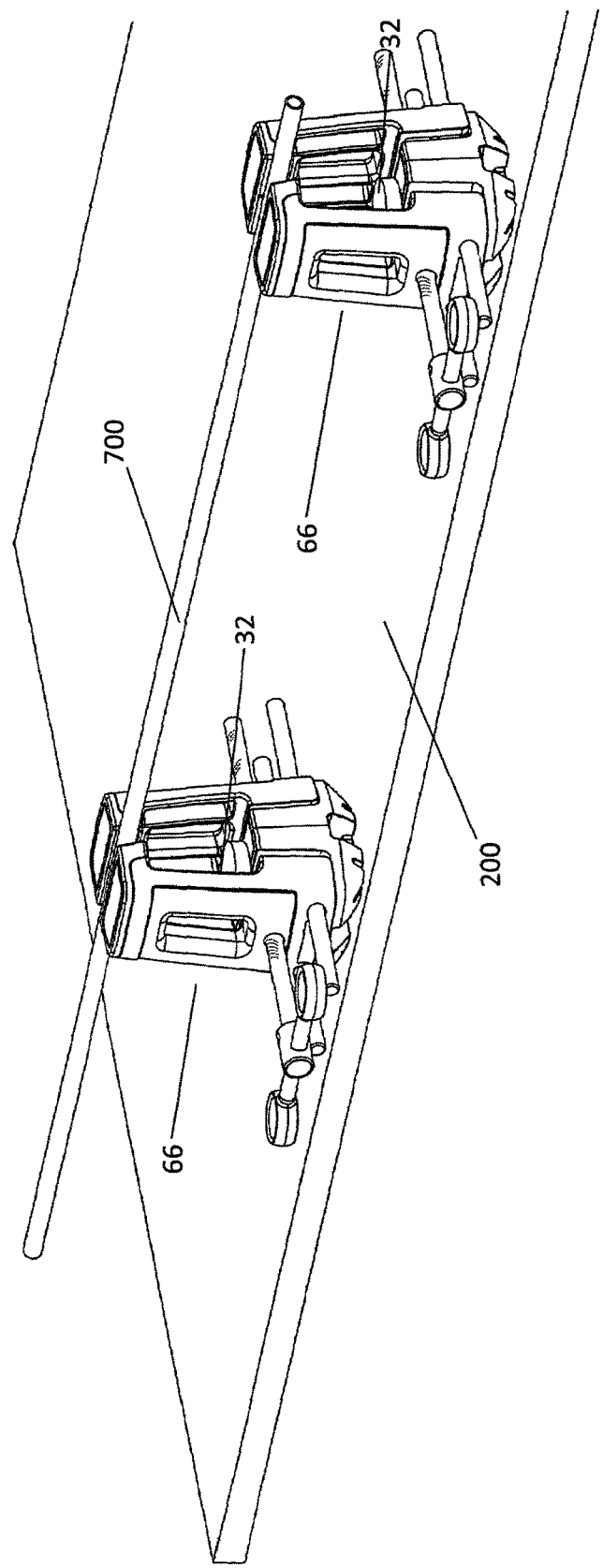
FIG. 17 is a perspective view showing two holders each comprising a vise assembly fastened to a table or work bench in spaced relation as a tool to clamp a section of household copper pipe illustrating the holders versatility, adjustability, and/or adaptability to other non-ski, snowboard, bicycle and firearm uses, in accordance with an embodiment of the disclosure.

According to one embodiment of the disclosure, a first holder 10 is provided for use in spaced relation with a second holder 10 as a firearm support, the holder being adapted to support one of the opposing end portions of a gun 600. The portable holder comprises a base section 1 adapted to be fixed to the work station 200 in a generally upright position and a threaded rod portion 2 mounted to the base section 1 in a generally upright and vertical orientation. As shown in FIG. 16, according to one embodiment, a support head 4 mounted upon the threaded rod 2 allows a gun barrel cradle 44 to be mounted on one (the right) of the holders 10. The gun barrel cradle 44, according to one embodiment, has a "V" shaped profile 89 allowing a very wide variety of gun barrel diameters to be held between and within angled flanges 170 and 171, the "V" shaped profile 89 also allowing the gun barrel to be automatically centered relative to the vertical axis of the gun barrel cradle 44 when resting thereon. As the "V" shaped profile 89 only supports the bottom portion of the gun barrel a clear line of sight can be established down the top longitudinal portion of the barrel necessary when performing firearm sighting operations. The gun barrel cradle 44, according to one embodiment, has a resilient rubber top surface 91 to prevent damage to the gun barrel surface and provide for good frictional engagement therewith. The gun barrel cradle 44 is mounted to the support head of the holder for movement between a position where the cradle is generally horizontal to one where the cradle is generally vertical, allowing the cradle to pivot between horizontal and vertical positions to accommodate various barrel inclination angles. A vise assembly 66 as described above is mounted to the threaded rod 2 portion of the second (left) holder 10 with the vise base 99, according to one embodiment, having a resilient top pad 181 to frictionally engage the bottom of a gunstock resting thereon, permitting centered clamping of the gunstock along its longitudinal axis between the oppositely disposed vise jaws 110 and 113. The threaded rod 2 of the second (left) holder is provided with two reversely disposed sections of threads 111a and 111b with corresponding complimentary threads in threaded apertures 3 and 101 (see FIG. 33) of base section 1 and vise base 99 respectively. A thread-free section 112 on threaded rod 2 between reversely disposed threads 111a and 111b is, according to one embodiment, provided with a knurled surface to assist in obtaining a firm grip when using thumb and fore finger to conveniently turn the threaded rod 2 either clock-wise or counter clock-wise about its vertical axis to permit convenient height adjustment of the vise assembly 66 and gunstock relative to the base section 1 of the holder 10 and allows the angle of inclination of the gun 600 to be readily adjusted relative to the holders 10. Locking nut 98 on the lower portion of threaded rod 2 is tightened and compressed against the top portion 23 of the base section 1 allowing the threaded rod portion 2 and vise assembly 66 to be fastened to the vise base 99 in a fixed position once the holder 10 has been adjusted to the desired height.

It will be appreciated that in other embodiments, two components may be mated together with various clamping, threading and/or other locking or engagement systems known to those of skill in the art. An embodiment has described threaded rods and apertures for connecting and orienting the base section to the support head. In other embodiments, the threaded portion in the aperture in the base may be provided on the support head. In other embodiments, a clamp or friction fit system may be used instead of or in addition to the threads on the rod and the support head. For example, a telescoping rod may be provided with a swivel joint attached to its head. A locking pin may be provided to lock the rod in place. The pin may engage with apertures on the rod. Alternatively or additionally a collar may be provided that can be tightened in place around or about the rod to lock the rod at a given orientation and/or displacement. Such systems may also be provided in the vise jaws, as described earlier.

It will be appreciated that features describing aspects of embodiments as being "straight", "horizontally oriented", "vertically oriented", "upright" or in other terms relating to position or orientation have a range of acceptable values or positions that, if provided, still provide a functional embodiment. For example, a component described as being "horizontal" will encompass an embodiment where the component is substantially horizontal. As a further example, if two components are described as being "parallel" in orientation, other embodiments will tolerate the two components being aligned in a nearly parallel fashion. Similarly, if a component is described as being "straight", other embodiments will tolerate a component being nearly straight. It will be plainly obvious to a person of skill in the art as to what range of values would be acceptable.

Although the disclosure has been described with reference to certain specific embodiments, various modifications thereof will be apparent to those skilled in the art without departing from the scope of the disclosure as outlined in the claims appended hereto.

The invention claimed is:

1. A holder system for supporting sports equipment, the holder system comprising: a first holder comprising a vise assembly comprising a vise base; two moveable vise jaws provided with respective vise screw bores and guide bores, the two moveable vise jaws engageable with a first section on the sports equipment, each of the movable vice jaws having a recessed stepped indent to receive and hold pins of varying diameters in a horizontal orientation when the movable vice jaws are closed upon both ends of one of the pins extending between and perpendicular to the movable vise jaws, the pins being fastenable onto bindings of the sports equipment, a vise screw extending substantially horizontally through the vise base and oppositely disposing the movable vise jaws through the vise screw bores; and having two sections of threads allowing for movement of the movable vise jaws, the two sections being separated by a thread-free section; one or more guide bars fixed in a substantially horizontal orientation in the vise base and extending through the respective guide bores: and a base section adapted to be fixed to a work station, the base section having a substantially vertical aperture, the rod having an upper portion affixed to the vise assembly.

2. The holder system of claim 1 wherein the two moveable vise jaws each have a flat top surface to allow the sports equipment to be laid flat on top of the two moveable vise jaws.

3. The holder system of claim 1 wherein: the rod is a threaded rod; the base section is connectable to the threaded rod; and the substantially vertically oriented aperture of the base section is threaded to receive the threaded rod.

4. The holder system of claim 3, wherein: the threaded rod extends vertically through the vise assembly; and has two reversely disposed sections of threads provided to allow for movement of the vise assembly; the vise base and the vise assembly each have vertically oriented threaded bores formed therein to engage with threads on the threaded rod; and the threaded rod is rotatable about a longitudinal axis of the threaded rod to adjust a height of the vise assembly relative to the vise base.

5. The holder system of claim 1, wherein the base section further comprises: a second set of vise screw bores and guide bores aligned to receive the rod and the one or more guide bars.

6. The holder system of claim 1, wherein the vise screw further comprises: a recessed groove in a middle of the vise screw to accept an external retaining ring acting as a shoulder against walls of a vertical groove extending downward from a top portion of the vise base so the vise screw is held in a substantially horizontal aperture so as to be immovable in the direction of a longitudinal axis of the vise screw but rotatable about the longitudinal axis.

7. The holder system of claim 1, wherein the vise screw and guide bars are detachably secured to the vise base and are exchangeable with different sizes of vise screws and guide bars to accommodate widths of different firearms held in the vise assembly.

8. The holder system of claim 1, wherein the vise screw further comprises: a handle assembly fastened to one end of the vise screw, the handle assembly having a handle end cap with an aperture; and a lever transversely and slidably mounted through the aperture of the handle end cap, the lever having index finger rings mounted on both ends of the lever to prevent the lever from becoming detached from the handle assembly.

9. The holder system of claim 1, further comprising: an eyebolt anchored by the pins to fasten and support the sports equipment resting base up on the holder system when the eyebolt is turned into a threaded insert on the sports equipment.

10. The holder system of claim 1, wherein each of the movable vise jaws further comprises: an oppositely disposed "C" shaped profile allowing a holder support head and a clamp knob to be positioned within the vise assembly between the movable vise jaws when clamping, wherein the profile allows the movable vise jaws to hold a ski brake of the sports equipment in a retracted position between the movable vise jaws when clamping the sports equipment with a binding facing base up.

11. The holder system of claim 10, wherein the support head further comprises: a vertical slot located between the movable vise jaws to stabilize the sports equipment in a generally upright position when the support head is rotated about a vertical axis of the support head such that the vertical slot is aligned parallel with the movable vise jaws and the sports equipment is located into the slot and clamped between the movable vise jaws.

12. The holder system of claim 1, wherein the first holder further comprises a support head having an upper portion defined by a front flange spaced from a rear flange, the support head supporting a second section on the sports equipment; a support tongue disposed between the front and rear flanges and mounted for pivotal movement relative to the support head to conform to the sports equipment, the support tongue having a recess and a spring to interact between the support head and the support tongue; and a locking block carried in one of the front or rear flanges, being movable into the recess and being bias outwardly by the spring.

13. The holder system of claim 12, wherein: the sports equipment is either a ski or a snowboard; and in the support head the upper portion further comprises an upper portion including a horizontal flat surface, and an elongated slot with an opening at one longitudinal end, the elongated slot having a width sufficient to receive the sports equipment in a perpendicular orientation to a longitudinal axis of the support head to hold the sports equipment in a generally upright position.

14. The holder system of claim 13, wherein: the support head and the vise assembly can be rotated as a unit about the base section.

15. The holder system of claim 14, wherein: rotation of the support head and the vise assembly is permitted through a vertical axis of the holder system such that two opposing longitudinal edges of the elongated slot contact top and bottom surfaces of the sports equipment to hold the sports equipment in an upright position.

16. The holder system of claim 14, wherein: rotation of the support head and the vise assembly is permitted through a vertical axis of the holder system from a position where the support head is perpendicular to a longitudinal axis of the sports equipment to a position where the support head is parallel to the longitudinal axis of the sports equipment.

17. The holder system of claim 13, wherein: the support head is located under a shovel or tail portion of the sports equipment.

18. The holder system of claim 13, further comprising: second and third holders positionable in spaced relation to the first holder, each having a vise assembly similar to the vice assembly of the first holder, wherein the third holder is positionable under shovel and tail portions of the ski or snowboard and the second holder is positionable between the first holder and the third holder under a binding portion of the ski or snowboard providing a three-point support arrangement for the ski or snowboard.

19. A holder system for supporting a ski or a snowboard, the holder system comprising: a vise assembly comprising a vise base; two moveable vise jaws provided with respective vise screw bores and guide bores, the two moveable vise jaws engageable with a first section on the ski or the snowboard; a vise screw extending substantially horizontally through the vise base and oppositely disposing the movable vise jaws through the vise screw bores, the vice screw having two sections of threads allowing for movement of the movable vise jaws, the two sections being separated by a thread-free section; one or more guide bars fixed in a substantially horizontal orientation in the vise base and extending through the respective guide bores; and a support head supporting a second section on the ski or the snowboard, the support head having: an upper portion defined by a front flange spaced from a rear flange, a horizontal flat surface, and an elongated slot with an opening at one longitudinal end, the elongated slot having a width sufficient to receive the ski or the snowboard in a perpendicular orientation to a longitudinal axis of the support head to hold the ski or the snowboard in a generally upright position; a support tongue disposed between the front and rear flanges, having a recess, being mounted for pivotal movement relative to the support head to conform to the ski or the snowboard and having a spring to interact between the support head and the support tongue; and a locking block carried in one of the front or rear flanges, being movable into the recess and being bias outwardly by the spring.

20. A holder system for supporting sports equipment, the holder system comprising: a vise assembly comprising a vise base; two moveable vise jaws provided with respective vise screw bores and guide bores, the two moveable vise jaws engageable with a first section on the sports equipment; a vise screw extending substantially horizontally through the vise base and oppositely disposing the movable vise jaws through the vise screw bores, the vice screw having two sections of threads allowing for movement of the movable vise jaws, the two sections being separated by a thread-free section; and a recessed groove in a middle of the vise screw to accept an external retaining ring acting as a shoulder against walls of a vertical groove extending downward from a top portion of the vise base so the vise screw is held in a substantially horizontal aperture so as to be immovable in the direction of a longitudinal axis of the vise screw but rotatable about the longitudinal axis; and one or more guide bars fixed in a substantially horizontal orientation in the vise base and extending through the respective guide bores.

* * * * *